US012761665B2

(12) United States Patent
Nishibeppu et al.

(10) Patent No.: US 12,761,665 B2
(45) Date of Patent: Oct. 13, 2026

(54) VEHICLE CONTROL METHOD, VEHICLE CONTROL PROGRAM, AND VEHICLE CONTROL SYSTEM

(71) Applicant: Yanmar Holdings Co., Ltd., Osaka (JP)

(72) Inventors: Shinya Nishibeppu, Okayama (JP); Seungkyu Lee, Okayama (JP); Kohei Ishikawa, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 64 days.

(21) Appl. No.: 18/741,827

(22) Filed: Jun. 13, 2024

(65) Prior Publication Data

US 2025/0013245 A1 Jan. 9, 2025

(30) Foreign Application Priority Data

Jul. 7, 2023 (JP) ................................. 2023-111941
Apr. 19, 2024 (JP) ................................. 2024-068162

(51) Int. Cl.

*G05D 1/622* (2024.01)
*G05D 105/15* (2024.01)
*G05D 111/10* (2024.01)
*G06V 20/58* (2022.01)

(52) U.S. Cl.

CPC ............ *G05D 1/622* (2024.01); *G06V 20/58* (2022.01); *G05D 2105/15* (2024.01); *G05D 2111/10* (2024.01); *G06V 2201/08* (2022.01)

(58) Field of Classification Search

CPC .......... G05D 1/648; G05D 1/02; G05D 1/622; A61G 5/04; B61L 29/30; B60W 40/08; B60Q 9/00; G08G 1/166

See application file for complete search history.

(56) References Cited

FOREIGN PATENT DOCUMENTS

| | | | | | |
|---|---|---|---|---|---|
| CN | 104408970 | A | * | 3/2015 | ............. G08G 1/166 |
| CN | 212302293 | U | * | 1/2021 | ............... G05D 1/02 |
| CN | 114103997 | A | * | 3/2022 | ............... B60Q 9/00 |
| CN | 115892029 | A | * | 4/2023 | ............ B60W 40/08 |
| EP | 0976640 | A2 | * | 2/2000 | .............. B61L 29/30 |
| EP | 3819182 | A1 | | 5/2021 | |
| EP | 3991533 | A1 | | 5/2022 | |
| KR | 102146206 | B1 | * | 8/2020 | ............... A61G 5/04 |

* cited by examiner

*Primary Examiner* — Yuri Kan
(74) *Attorney, Agent, or Firm* — Chris Mizumoto

(57) ABSTRACT

An acquisition processing unit acquires, when a work vehicle performs autonomous travel according to a target route, distance information relating to a distance to a detection target that is detected by an obstacle sensor, and image information relating to a capture image of the detection target that is captured by a camera. A determination processing unit determines a type of the detection target based on the image information. A countermeasure processing unit causes the work vehicle to execute countermeasure processing according to the type of the detection target and the distance information.

13 Claims, 13 Drawing Sheets

VEHICLE CONTROL METHOD, VEHICLE CONTROL PROGRAM, AND VEHICLE CONTROL SYSTEM

CROSS-REFERENCE

This application claims foreign priority of JP2023-111941 filed Jul. 7, 2023 and JP2024-068162 filed Apr. 19, 2024, the disclosures of which are hereby incorporated by reference in its entirety.

TECHNICAL FIELD

The present invention relates to a technique that controls a motion of a work vehicle when a detection target such as an obstacle has been detected.

BACKGROUND ART

Conventionally, a work vehicle is known that is equipped with an obstacle sensor such as an infrared sensor or an ultrasonic sensor, and which is capable of detecting a detection target within a detection range while performing autonomous travel (for example, see Patent Document 1). The work vehicle executes an avoidance control to avoid a collision with an obstacle when the detection target is an obstacle.

PRIOR ART DOCUMENT

Patent Document

Patent Document 1: Japanese Unexamined Patent Application Publication No. 2021-65115

SUMMARY OF INVENTION

Technical Problem

However, in the conventional technique, the presence or absence of an obstacle is determined based on a distance to the detection target. Therefore, for example, even when the detection target is an object that does not require the work vehicle to perform an avoidance motion (a work target object such as a reaping target object or a harvesting target object), the work vehicle executes the avoidance motion when the distance to the detection target becomes less than or equal a threshold. As a result, a problem occurs in that the work efficiency of the work vehicle decreases.

An object of the present invention is to provide a vehicle control method, a vehicle control program, and a vehicle control system that prevent a decrease in the work efficiency of a work vehicle, while also being capable of causing the work vehicle to execute suitable countermeasure processing with respect to an obstacle.

Solution to Problem

A vehicle control method according to the present invention is a method that executes: acquiring, when a work vehicle performs autonomous travel according to a target route, distance information relating to a distance to a detection target that is detected by a detection unit; acquiring image information relating to a capture image of the detection target that is captured by an imaging unit; determining a type of the detection target based on the image information; and causing the work vehicle to execute countermeasure processing according to the type of the detection target and the distance information.

A vehicle control program according to the present invention is a program for causing one or more processors to execute: acquiring, when a work vehicle performs autonomous travel according to a target route, distance information relating to a distance to a detection target that is detected by a detection unit; acquiring image information relating to a capture image of the detection target that is captured by an imaging unit; determining a type of the detection target based on the image information; and causing the work vehicle to execute countermeasure processing according to the type of the detection target and the distance information.

A vehicle control system according to the present invention includes an acquisition processing unit, a determination processing unit, and a countermeasure processing unit. The acquisition processing unit acquires, when a work vehicle performs autonomous travel according to a target route, distance information relating to a distance to a detection target that is detected by a detection unit, and image information relating to a capture image of the detection target that is captured by an imaging unit. The determination processing unit determines a type of the detection target based on the image information. The countermeasure processing unit causes the work vehicle to execute countermeasure processing according to the type of the detection target and the distance information.

Advantageous Effects of Invention

According to the present invention, it is possible to provide a vehicle control method, a vehicle control program, and a vehicle control system that prevent a decrease in the work efficiency of a work vehicle, while also being capable of causing the work vehicle to execute suitable countermeasure processing with respect to an obstacle.

DESCRIPTION OF EMBODIMENTS

The following embodiment is an example embodying the present invention, and does not limit the technical scope of the present invention.

Figure 1:
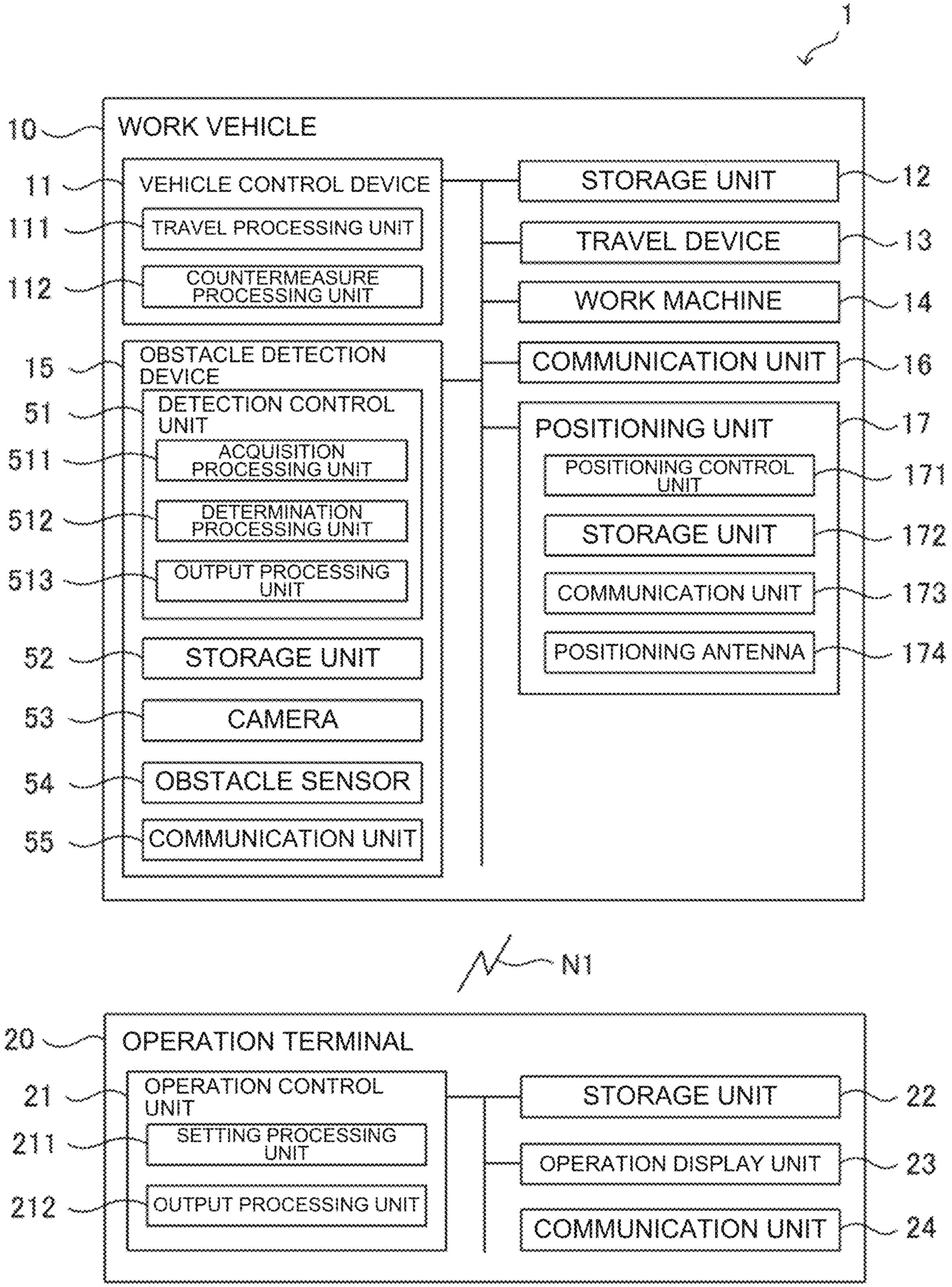
FIG. 1 is a block diagram showing a configuration of an autonomous travel system according to an embodiment of the present invention.

As shown in FIG. 1, an autonomous travel system 1 according to the embodiment of the present invention includes a work vehicle 10 and an operation terminal 20. The work vehicle 10 and the operation terminal 20 are capable of communicating with each other via a communication network N1. For example, the work vehicle 10 and the operation terminal 20 are capable of communicating with each other via a mobile phone line network, a packet line network, or a wireless LAN.

In the present embodiment, a case where the work vehicle 10 is a tractor will be described as an example. Note that, as other embodiments, the work vehicle 10 may be a combine, a rice transplanter, a construction machine, a snowplow, or the like. The work vehicle 10 is a so-called robot tractor that is configured to be capable of performing autonomous travel in a field F (see FIG. 3) according to a preset target route R. For example, the work vehicle 10 is capable of performing autonomous travel along the target route R generated in advance based on position information relating to the current position of the work vehicle 10 that is calculated by a positioning unit 17.

Figure 3:
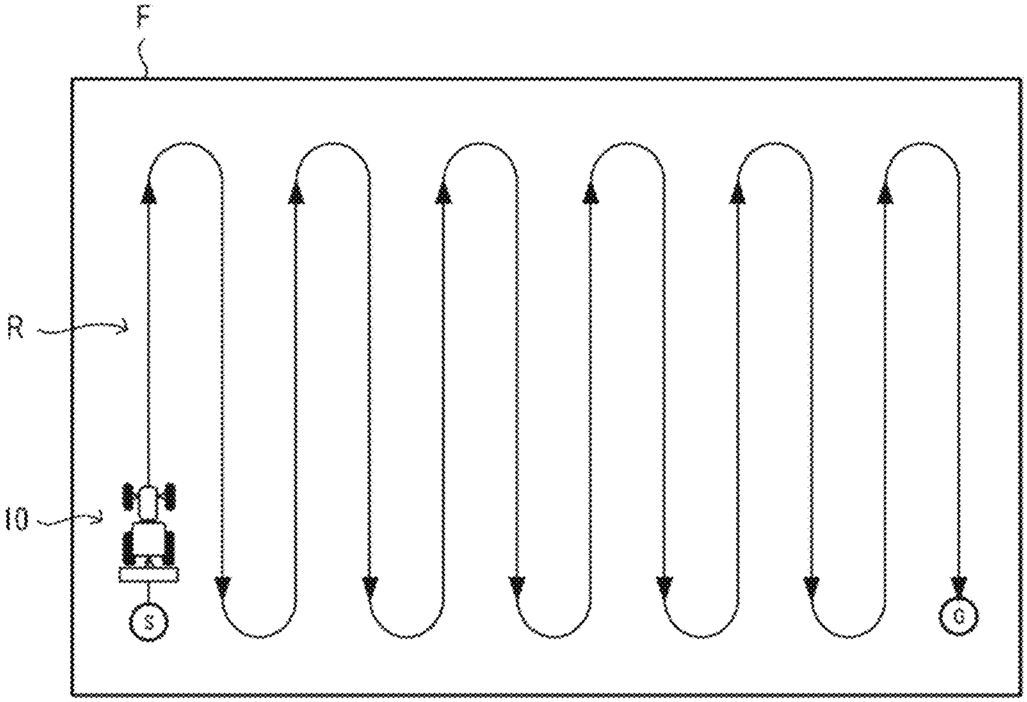
FIG. 3 is a diagram showing an example of a travel route of the work vehicle according to the embodiment of the present invention.

For example, the work vehicle 10 travels back and forth in parallel from a travel start position S to a travel end position G in a work area of the field F shown in FIG. 3. The outer peripheral side of the field F is, for example, a headland area, and the work vehicle 10 performs turning travel in the headland area. The target route R is not limited to the route shown in FIG. 3, and can be set as appropriate according to the work content.

The operation terminal 20 is a mobile terminal that is capable of remotely operating the work vehicle 10, and is configured by, for example, a tablet terminal, a notebook personal computer, a smartphone, or the like. An operator can perform setting operations for various setting items on the operation terminal 20. Furthermore, the operation terminal 20 displays information such as the work status and travel status of the work vehicle 10 while performing autonomous travel. The operator is capable of grasping the work status and travel status using the operation terminal 20.

Work Vehicle 10

Figure 2:
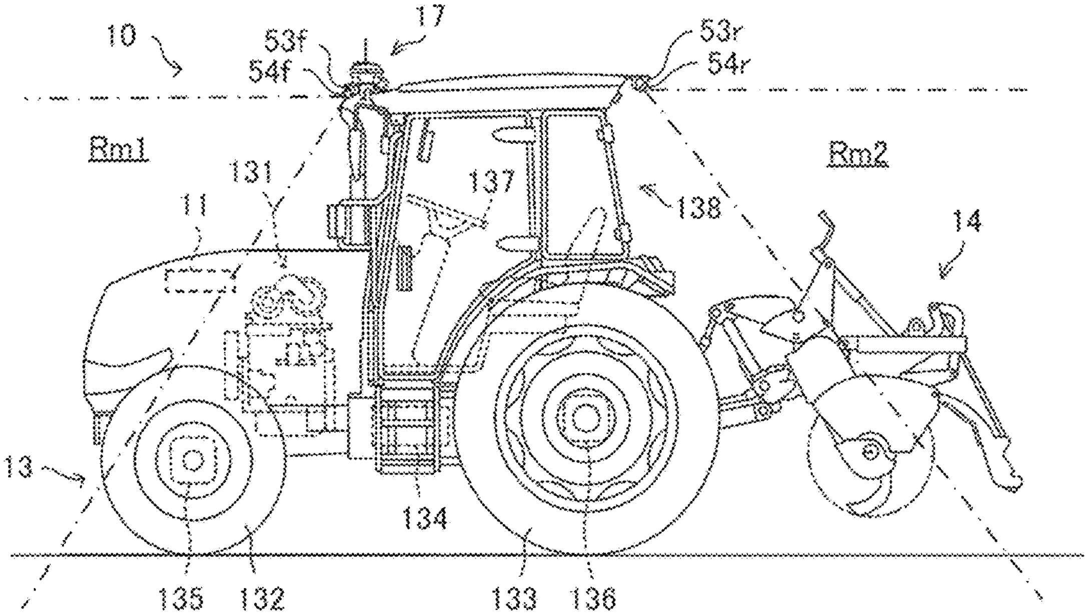
FIG. 2 is an external view showing an example of a work vehicle according to the embodiment of the present invention.

As shown in FIGS. 1 and 2, the work vehicle 10 includes a vehicle control device 11, a storage unit 12, a travel device 13, a work machine 14, an obstacle detection device 15, a communication unit 16, a positioning unit 17, and the like. The vehicle control device 11 is electrically connected to the storage unit 12, the travel device 13, the work machine 14, the obstacle detection device 15, the positioning unit 17, and the like. Note that the vehicle control device 11 and the obstacle detection device 15 may be capable of wireless communication, and the vehicle control device 11 and the positioning unit 17 may be capable of wireless communication.

The communication unit 16 is a communication interface that connects the work vehicle 10 to the communication network N1 in a wired or wireless manner, and is for executing data communication according to a predetermined communication protocol with an external apparatus (such as the operation terminal 20) via the communication network N1.

The storage unit 12 is a non-volatile storage unit, such as a hard disk drive (HDD) or a solid state drive (SSD), that stores various types of information. The storage unit 12 stores a control program such as an autonomous traveling program for causing the vehicle control device 11 to execute autonomous traveling processing described below (refer to FIG. 12). For example, the autonomous travel program is non-transiently recorded on a computer-readable recording medium such as a CD or a DVD, is read by a predetermined reading device (not illustrated), and then stored in the storage unit 12. Note that the autonomous travel program may be downloaded from a server (not illustrated) to the work vehicle 10 via the communication network N1, and then stored in the storage unit 12. In addition, the storage unit 12 stores data relating to the target route R and the like, which is generated in the operation terminal 20.

The travel device 13 is a drive unit that causes the work vehicle 10 to travel. As shown in FIG. 2, the travel device 13 includes an engine 131, front wheels 132, rear wheels 133, a transmission 134, a front axle 135, a rear axle 136, a steering wheel 137, and the like. Note that the front wheels 132 and the rear wheels 133 are provided on both the left and right of the work vehicle 10. Furthermore, the travel device 13 is not limited to a wheel-type device that includes the front wheels 132 and the rear wheels 133, and may be a crawler-type device including crawlers provided on the left and right of the work vehicle 10.

The engine 131 is a drive source such as a diesel engine or a gasoline engine that is driven by using a fuel that is supplied to a fuel tank (not illustrated). The travel device 13 may include an electric motor as a drive source in addition to the engine 131, or instead of the engine 131. Note that an electric generator (not illustrated) is connected to the engine 131, and electric power is supplied from the electric generator to electric components provided in the work vehicle 10, such as the vehicle control device 11, the obstacle detection device 15, and the positioning unit 17, and a battery and the like. The battery is charged by the electric power supplied from the electric generator. Further, the electric components provided in the work vehicle 10, such as the vehicle control device 11, the obstacle detection device 15, and the positioning unit 17 can be driven by electric power from the battery even after the engine 131 is stopped.

The drive force of the engine 131 is transmitted to the front wheels 132 via the transmission 134 and the front axle 135, and transmitted to the rear wheels 133 via the transmission 134 and the rear axle 136. Furthermore, the drive force of the engine 131 is also transmitted to the work machine 14 via a PTO shaft (not illustrated). When the work vehicle 10 performs autonomous travel, the travel device 13 performs travel motions according to commands from the vehicle control device 11. In addition, the travel device 13 causes the work vehicle 10 to perform decelerated travel, or to stop, according to commands from the vehicle control device 11.

The work machine 14 is, for example, a cultivator, a mower, a plow, a fertilizer applicator, a sprayer (chemical dispersion machine), a puddling machine, or a seeding machine, and can be detachably mounted on the work vehicle 10. This allows the work vehicle 10 to perform various types of work by using various work machines 14. FIG. 2 shows a case in which the work machine 14 is a cultivator. For example, the work machine 14 is mounted on the rear of the work vehicle 10. The work vehicle 10 performs cultivation work by traveling in the field F with the work machine 14 mounted on the rear.

The steering wheel 137 is an operation unit that is operated by the operator, or by the vehicle control device 11. For example, in the travel device 13, the angle of the front wheels 132 is changed by a hydraulic power steering mechanism (not illustrated) or the like in response to operation of the steering wheel 137 by the vehicle control device 11, and the travel direction of the work vehicle 10 changes.

In addition to the steering wheel 137, the travel device 13 includes a shift lever, an accelerator, a brake, and the like (not illustrated), which are operated by the vehicle control device 11. Further, in the travel device 13, the gear of the transmission 134 is switched to a forward gear, a reverse gear, or the like in response to operation of the shift lever by the vehicle control device 11, which switches the travel mode of the work vehicle 10 to forward movement, reverse movement, or the like. Furthermore, the vehicle control device 11 also controls the rotation speed of the engine 131 by operating the accelerator. In addition, the vehicle control device 11 also operates the brake to stop the rotation of the front wheels 132 and the rear wheels 133 by using an electromagnetic brake.

The positioning unit 17 is a communication apparatus that includes a positioning control unit 171, a storage unit 172, a communication unit 173, and a positioning antenna 174. For example, as shown in FIG. 2, the positioning unit 17 is provided in an upper part of a cabin 138 in which an operator boards. Furthermore, the installation position of the positioning unit 17 is not limited to the cabin 138. Also, the positioning control unit 171, the storage unit 172, the communication unit 173, and the positioning antenna 174 of the positioning unit 17 may be distributed and arranged in different positions of the work vehicle 10. Note that, as mentioned above, the battery is connected to the positioning unit 17, and the positioning unit 17 can be operated even when the engine 131 is stopped. In addition, for example, as the positioning unit 17, a mobile phone terminal, a smartphone, a tablet terminal, a quantum compass, or the like, may be used instead.

The positioning control unit 171 is a computer system that includes one or more processors, and a storage memory such as a non-volatile memory and a RAM. The storage unit 172 is a non-volatile memory or the like that stores a program for causing the positioning control unit 171 to execute positioning processing, and data such as positioning information and movement information. For example, the program is non-transiently recorded in a computer-readable recording medium such as a CD or a DVD, is read by a predetermined reading device (not illustrated), and then stored in the storage unit 172. Note that the program may be downloaded from a server (not illustrated) to the positioning unit 17 via the communication network N1, and then stored in the storage unit 172.

The communication unit 173 is a communication interface that connects the positioning unit 17 to the communication network N1 in a wired or wireless manner, and is for executing data communication according to a predetermined communication protocol with an external apparatus, such as a base station server, via the communication network N1.

The positioning antenna 174 is an antenna that receives radio waves (GNSS signals) transmitted from satellites.

The positioning control unit 171 calculates the current position of the work vehicle 10 based on the GNSS signals that are received from the satellites by the positioning antenna 174. For example, when the work vehicle 10 performs autonomous travel in the field F, and the positioning antenna 174 receives radio waves (the transmission time, the orbit information, and the like) that are transmitted from each of the plurality of satellites, the positioning control unit 171 calculates the distance between the positioning antenna 174 and each of the satellites, and calculates the current position (latitude and longitude) of the work vehicle 10 based on the calculated distances. Furthermore, the positioning control unit 171 may perform positioning by a real-time kinematic method (RTK-GNSS positioning method (RTK method)), in which the current position of the work vehicle 10 is calculated using correction information corresponding to a base station (reference station) close to the work vehicle 10. In this way, the work vehicle 10 performs autonomous travel using positioning information obtained using the RTK method. Note that the current position of the work vehicle 10 may be the same position as the positioning position (for example, the position of the positioning antenna 174), or may be a position that is offset from the positioning position.

When the obstacle detection device 15 detects a detection target while the work vehicle 10 is performing autonomous travel, the detection device 15 determines a type of the detection target (a person, a vehicle, or other (such as a building or materials)), and outputs the determination result to the vehicle control device 11. Specifically, the obstacle detection device 15 includes a detection control unit 51, a storage unit 52, a camera 53, an obstacle sensor 54, a communication unit 55, and the like. The obstacle detection device 15 may be configured as a single unit and installed to the work vehicle 10, or a plurality of components may be distributed and arranged in the work vehicle 10.

The communication unit 55 is a communication interface that connects the obstacle detection device 15 to the communication network N1 in a wired or wireless manner, and is for executing data communication according to a predetermined communication protocol with an external apparatus (such as the operation terminal 20) via the communication network N1.

The storage unit 52 is a non-volatile storage unit such as an HDD or an SSD that stores various types of information. The storage unit 52 stores control programs such as an obstacle detection program for causing the obstacle detection device 15 to execute obstacle detection processing. For example, the obstacle detection program is non-transiently recorded in a computer-readable recording medium such as a CD or a DVD, is read by a predetermined reading device (not illustrated), and then stored in the storage unit 52. Note that the obstacle detection program may be downloaded from a server (not illustrated) to the obstacle detection device 15 via the communication network N1, and then stored in the storage unit 52.

Figure 8:
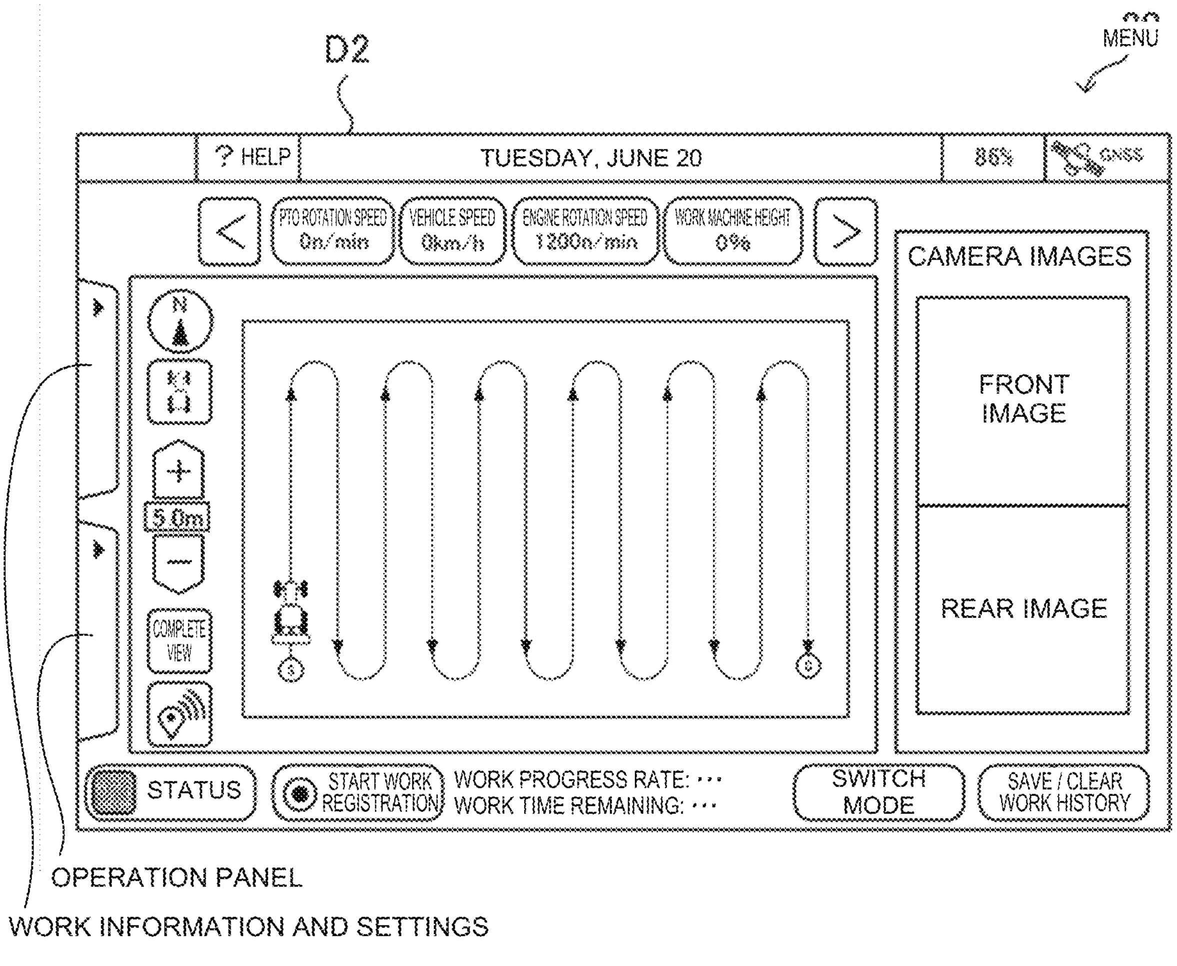
FIG. 8 is a diagram showing an example of a travel screen that is displayed on the operation terminal according to the embodiment of the present invention.

The camera 53 is a digital camera that captures an image of a subject included in a predetermined imaging range, and outputs the image as digital image data. The camera 53 continuously captures images of a subject at a predetermined frame rate, generates frame images (capture images) at a predetermined resolution, and sequentially transmits the frame images to the detection control unit 51. Furthermore, the camera 53 transmits the image data of the capture images to the operation terminal 20 via the communication unit 55. The operation terminal 20 is capable of displaying the capture images on an operation screen of an operation display unit 23 (see FIG. 8).

Furthermore, the camera 53 includes a front camera **53*f* that is capable of imaging an imaging range at the front when viewed from the work vehicle 10, and a rear camera 53*r* that is capable of imaging an imaging range at the rear when viewed from the work vehicle 10. As shown in FIG. 2, the front camera 53*f* is arranged on the upper front side of the cabin 138, and the rear camera 53*r* is arranged on the upper rear side of the cabin 138**.

The obstacle sensor 54 is a sensor that detects a detection target in a predetermined detection range using infrared rays, ultrasonic waves, or the like. For example, the obstacle sensor 54 may be a lidar sensor (distance sensor) capable of three-dimensionally measuring the distances to a detection target using a laser, or a sonar sensor including a plurality of sonars that are capable of measuring the distance to a detection target using ultrasonic waves. The obstacle sensor 54 is installed on the front center, rear center, right side, and left side of the work vehicle 10, and detects obstacles by monitoring the surroundings of the work vehicle 10. In the present embodiment, an example will be described in which the obstacle sensor 54 includes a front obstacle sensor **54*f* capable of detecting a detection target in a detection range at the front when viewed from the work vehicle 10, and a rear obstacle sensor 54*r* capable of detecting a detection target in a detection range at the rear when viewed from the work vehicle 10. As shown in FIG. 2, the front obstacle sensor 54*f* is arranged on the upper front side of the cabin 138, and the rear obstacle sensor 54*r* is arranged on the upper rear side of the cabin 138. The front camera 53*f* and the front obstacle sensor 54*f* may be configured as a single unit, and the rear camera 53*r* and the rear obstacle sensor 54*r* may be configured as a single unit. Note that the arrangement position and number of cameras 53 and obstacle sensors 54** is not limited, and may be determined according to the intended purpose.

Figure 4:
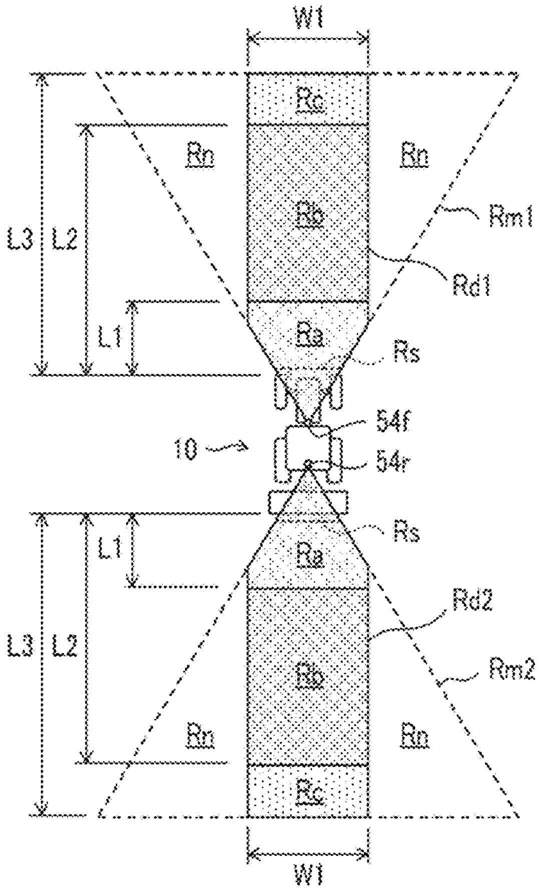
FIG. 4 is a diagram showing an example of the detection ranges of obstacle sensors provided in the work vehicle according to the embodiment of the present invention.

FIG. 4 shows an example of the measurement ranges (detection ranges) of each of the front obstacle sensor **54*f* and the rear obstacle sensor 54*r*. Note that, those descriptions below that are common to both the front obstacle sensor 54*f* and the rear obstacle sensor 54*r* will refer to an "obstacle sensor 54**".

The obstacle sensor 54, for example, measures the distance to each range point (measurement target) that exists in the measurement range using a laser (such as an infrared laser beam), and generates a distance image or the like based on the measurement information. The obstacle sensor 54 includes an electronic control unit in which a microcontroller and the like are integrated, and a processing unit that is constructed by various control programs and the like. The obstacle sensor 54 is connected to the detection control unit 51, the vehicle control device 11, and the like, via a CAN so as to enable mutual communication.

As shown in FIGS. 2 and 4, the front obstacle sensor **54*f* has a first measurement range Rm1 at the front of the cabin 138 that is set as the measurement range. Further, the rear obstacle sensor 54*r* has a second measurement range Rm2 at the rear of the cabin 138** that is set as the measurement range.

As shown in FIG. 4, like the front camera **53*f* and the rear camera 53*r*, the front obstacle sensor 54*f* and the rear obstacle sensor 54*r* are arranged on a left-right center line of the work vehicle 10. The front obstacle sensor 54*f* is arranged in a left-right center location of an upper part on the front end side of the cabin 138, and is in a forward and downward-facing posture that looks down on the front side of the work vehicle 10 from diagonally above. As a result, the front obstacle sensor 54*f* has a predetermined range on the front side of the vehicle body, with the left-right center line of the work vehicle 10 as the axis of symmetry, set as the first measurement range Rm1. The rear obstacle sensor 54*r* is arranged in a left-right center location of an upper part on the rear end side of the cabin 138, and is in a backward and downward-facing posture that looks down on the rear side of the work vehicle 10 from diagonally above. As a result, the rear obstacle sensor 54*r* has a predetermined range on the rear side of the vehicle body, with the left-right center line of the work vehicle 10 as the axis of symmetry, set as the second measurement range Rm2**.

The front obstacle sensor **54*f* and the rear obstacle sensor 54*r* measure the distances from each of the sensors 54*f* and 54*r* to the range points in the first measurement range Rm1 or the second measurement range Rm2 using a time of flight (TOF) method, which measures the distance to a range point based on a round trip time of an irradiated laser to reach, and then return from, the range point. The front obstacle sensor 54*f* and the rear obstacle sensor 54*r* perform three-dimensional measurements in the first measurement range Rm1 or the second measurement range Rm2 by scanning a laser vertically and horizontally at high speed over the entire first measurement range Rm1 or second measurement range Rm2, and sequentially measuring the distances to the range points at each scanning angle (coordinate). The front obstacle sensor 54*f* and the rear obstacle sensor 54*r* sequentially measure the intensity of the reflected light (reflection intensity) from each range point that is obtained when a laser is scanned vertically and horizontally at high speed over the entire first measurement range Rm1 or second measurement range Rm2. The front obstacle sensor 54*f* and the rear obstacle sensor 54*r* repeatedly measure the distances to the range points in the first measurement range Rm1 or the second measurement range Rm2**, the reflection intensities, and the like, in real time.

The front obstacle sensor **54*f* and the rear obstacle sensor 54*r* generate a distance image and extract a range point group that has been estimated to represent an obstacle from the measurement information, such as the measured distances to the range points and the scanning angle (coordinate) with respect to the range points, and transmits the measurement information relating to the extracted range point group to the detection control unit 51** as the measurement information relating to an obstacle.

Furthermore, the front obstacle sensor **54*f* and the rear obstacle sensor 54*r* carry out cut processing and masking processing with respect to the first measurement range Rm1 or the second measurement range Rm2 based on vehicle body information and the like, which limits the obstacle detection range of the front obstacle sensor 54*f* and the rear obstacle sensor 54*r* to a first detection range Rd1 that has been set on the forward movement side of the work vehicle 10, and a second detection range Rd2 that has been set on a reverse movement side of the work vehicle 10 (see FIG. 4**).

In the cut processing, the front obstacle sensor **54*f* and the rear obstacle sensor 54*r* acquire a maximum left-right width of the vehicle body that includes the work machine 14 (in the present embodiment, the left-right width of the cultivator) by communication with the vehicle control device 11, and sets an obstacle detection target width W1 by adding a predetermined safety zone to the maximum left-right width of the vehicle body. Further, in the first measurement range Rm1 and the second measurement range Rm2, left and right areas outside the detection target width W1 are set by the cut processing as first non-detection ranges Rn, and are excluded from the detection ranges Rd1 and Rd2**.

In the masking processing, the front obstacle sensor **54*f* and the rear obstacle sensor 54*r* set an area in which a predetermined safe zone has been added to the area in which the front end side of the work vehicle 10 enters into the first measurement range Rm1, and an area in which the rear end side of the work machine 14 enters into the second measurement range Rm2 as second non-detection ranges Rs obtained by the masking processing, which are excluded from the detection ranges Rd1 and Rd2**.

In this way, by limiting the obstacle detection ranges to the first detection range Rd1 and the second detection range Rd2, the front obstacle sensor **54*f* and the rear obstacle sensor 54*r* avoid an increase in the detection load caused by detection of obstacles that are outside the detection target width W1 and have no risk of colliding with the work vehicle 10, and the possibility of erroneously detecting the front end side of the work vehicle 10 or the rear end side of the work machine 14 that have entered into the first measurement range Rm1 and the second measurement range Rm2** as obstacles.

The information relating to the first detection range Rd1, the second detection range Rd2, the first non-detection ranges Rn, and the second non-detection ranges Rs is included in the distance image described above, and is transmitted with the distance image to the detection control unit 51.

As shown in FIG. 4, the detection ranges Rd1 and Rd2 of the front obstacle sensor **54*f* and the rear obstacle sensor 54*r* are divided into a stopping control range Ra, a deceleration control range Rb, and a notification control range Rc based on collision determination processing, at which a predicted collision time becomes a set time (for example, 3 seconds). Specifically, the stopping control range Ra is set to a range from the front obstacle sensor 54*f* or the rear obstacle sensor 54*r* to a determination reference position of the collision determination processing. The deceleration control range Rb is set to a range from the determination reference position to a deceleration start position. The notification control range Rc is set to a range from the deceleration start position to the measurement limit position of the front obstacle sensor 54*f* or the rear obstacle sensor 54*r*. The determination reference position is set to a position that is a certain distance L1 (for example, 2 m) away from the front end or the rear end of the vehicle body, including the work machine 14, in the front-rear direction of the vehicle body. In the present embodiment, the range from the work vehicle 10 to the distance L1 is set as the stopping control range Ra, the range from the distance L1 to a distance L2 (for example, 10 m or less) is set as the deceleration control range Rb, and the range from the distance L2 to a distance L3** (for example, 20 m or less) is set as the notification control range Rc.

Note that the control ranges Ra, Rb and Rc in the first detection range Rd1 of the front obstacle sensor **54*f* and the second detection range Rd2 of the rear obstacle sensor 54*r* can be set according to the type, model, work content, vehicle speed, and the like, of the work vehicle 10. Furthermore, it is also possible to not carry out the cut processing with respect to the first measurement range Rm1 of the front obstacle sensor 54*f* and the second measurement range Rm2 of the rear obstacle sensor 54*r***.

The detection control unit 51 determines the type of a detection target (measurement target) based on the capture images acquired from the camera 53 and the measurement information acquired from the obstacle sensor 54, and outputs the determination result to the vehicle control device 11. Note that the detection control unit 51 may determine the type of a detection target (measurement target) based on the capture images acquired from the camera 53. An example of a case where a detection target in a front direction is detected when the work vehicle 10 is performing forward travel will be described below. An example of a case where a detection target in a rear direction is detected when the work vehicle 10 is performing reverse travel will be omitted.

The detection control unit 51 includes control apparatuses such as a CPU, a ROM, and a RAM. The CPU is a processor that executes various types of arithmetic processing. The ROM is a non-volatile storage unit that stores, in advance, control programs such as a BIOS and an OS for causing the CPU to execute the various types of the arithmetic processing. The RAM is a volatile or non-volatile storage unit that stores various types of information, and is used as a temporary storage memory (work area) for various types of processing executed by the CPU. The detection control unit 51 controls the obstacle detection device 15 by causing the CPU to execute various types of control programs stored in advance in the ROM or the storage unit 52.

Specifically, as shown in FIG. 1, the detection control unit 51 includes various processing units such as an acquisition processing unit 511, a determination processing unit 512, and an output processing unit 513. Note that the obstacle detection device 15 functions as the various processing units by causing the CPU to execute various types of processing according to the obstacle detection program. Furthermore, some or all of the processing units may be configured by electronic circuits. Also, the obstacle detection program may be a program for causing the plurality of processors to function as the processing units.

The acquisition processing unit 511 acquires capture images from the camera 53, and acquires measurement information from the obstacle sensor 54. Specifically, when the work vehicle 10 starts to perform autonomous travel, the acquisition processing unit 511 sequentially acquires capture images of the imaging range in the forward direction of travel from the front camera 53*f* while performing autonomous travel. The acquisition processing unit 511 stores the acquired capture images in the storage unit 52. Furthermore, when the work vehicle 10 starts to perform autonomous travel, the acquisition processing unit 511 sequentially acquires the measurement information (the range point group, the distance image, and information relating to the first detection range Rd1) of the first detection range Rd1 (see FIG. 4) in the forward direction of travel from the front obstacle sensor 54*f* while performing autonomous travel. The acquisition processing unit 511 stores the acquired measurement information in the storage unit 52.

The determination processing unit 512 determines the type of a detection target based on the capture images and the measurement information acquired by the acquisition processing unit 511. Specifically, the determination processing unit 512 performs image analysis on the capture images to determine the type of a detection target (such as a person, a vehicle, a building, materials, or a work target object (such as a reaping target object or a harvesting target object)). The determination processing unit 512 may estimate the type of a detection target using a known estimation model (learned model).

Furthermore, the determination processing unit 512 calculates a likelihood (certainty) of the determination result when the type of a detection target is determined. Specifically, the determination processing unit 512 calculates the likelihood (probability) based on the distance information included in the measurement information, that is, the distance from the work vehicle 10 (here, the front end of the work vehicle 10) to the detection target. The determination processing unit 512 calculates the likelihood such that the likelihood increases as the distance becomes shorter.

For example, when the determination processing unit 512 determines based on the capture images that a detection target is a person, the likelihood of a person is calculated as "50%" when the distance to the detection target is greater than a predetermined distance, and the likelihood of a person is calculated as "90%" when the distance to the detection target is less than the predetermined distance. Similarly, when the determination processing unit 512 determines based on the capture images that a detection target is a vehicle, the likelihood of a vehicle is calculated according to the distance to the detection target.

In addition, the determination processing unit 512 may calculate the likelihood based on the distance information and the capture images. For example, when only part of a detection target is included in the capture images and it is difficult to recognize the entire detection target, the determination processing unit 512 calculates a low likelihood for the detection target compared to a case where the entire detection target is included in the capture images. As a result, for example, in a case where the determination processing unit 512 has determined based on the capture images that a detection target is a person, and the distance to the detection target is less than the predetermined distance, the likelihood in a case where part of the person does not appear in the capture images is calculated as a lower likelihood (for example, "70%") than the likelihood ("90%") in a case where the entire person appears in the capture images. In this way, the determination processing unit 512 may adjust the likelihood according to the imaging state of a detection target included in the capture images.

In addition, the determination processing unit 512 may calculate the likelihood based on only the capture images. For example, it becomes easier to specify the type of a detection target as the size of a detection target that appears in the capture images becomes larger, and it becomes more difficult to specify the type of a detection target as the size of a detection target that appears in the capture images becomes smaller. As a result, the determination processing unit 512 calculates a high likelihood for a detection target when the size of the detection target that appears in the capture images is large, and calculates a low likelihood for a detection target when the size of a detection target that appears in the capture images is small. For example, when the determination processing unit 512 determines from the capture images that a detection target is a person, the likelihood is calculated as "90%" when the detection target that appears in the capture images is large, and the likelihood is calculated as "70%" when the detection target that appears in the capture images is small. In this way, the determination processing unit 512 may calculate the likelihood according to the size (such as the occupied area) of a detection target that is included in the capture images.

The output processing unit 513 outputs the determination result of the determination processing unit 512 to the vehicle control device 11. Specifically, the output processing unit 513 outputs the determination result (the type of the detection target), the likelihood of the determination result according to the distance to the detection target, and the likelihood threshold corresponding to the distance to the detection target (see FIG. 5) to the vehicle control device 11.

The likelihood threshold is a set parameter for determining whether or not to make the work vehicle 10 execute predetermined countermeasure processing (for example, stopping processing, deceleration processing, and notification processing), and is a threshold set with respect to a calculated likelihood. For example, the work vehicle 10 executes the countermeasure processing when the calculated likelihood exceeds the likelihood threshold.

Figure 5:
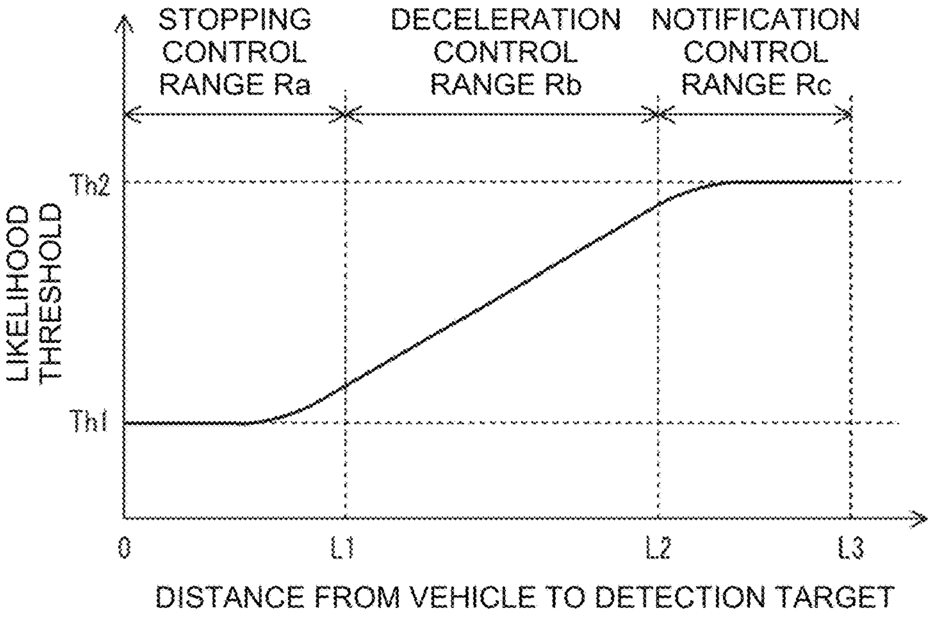
FIG. 5 is a diagram showing an example of likelihood thresholds used in the autonomous travel system according to the embodiment of the present invention.

Here, the likelihood threshold is set to a smaller value as the distance to a detection target becomes shorter. For example, as shown in FIG. 5, the detection control unit 51 sets the likelihood threshold to Th1 (for example, 50%) when the distance from the work vehicle 10 to a detection target is less than L1 (for example, 2 m), and sets the likelihood threshold to Th2 (for example, 90%) when the distance from the work vehicle 10 to a detection target is greater than or equal to L2 (where L1<L2, and Th1<Th2). In addition, when the distance from the work vehicle 10 to a detection target is L1 or more and less than L2, the detection control unit 51 sets the likelihood threshold between Th1 and Th2 according to the distance.

Furthermore, the likelihood threshold is set to different values according to the content of the countermeasure processing. For example, as shown in FIG. 5, the detection control unit 51 sets different likelihood thresholds to each of the stopping control range Ra in which stopping processing is executed, the deceleration control range Rb in which deceleration processing is executed, and the notification control range Rc in which notification processing is executed. Specifically, in the stopping control range Ra, which is close to the work vehicle 10, because there is no time before approaching or making contact with the detection target, the detection control unit 51 sets a low likelihood threshold such that it is more likely that the countermeasure processing is executed, even for a detection target with a low likelihood. On the other hand, in the notification control range Rc, which is a far away from the work vehicle 10, because there is time before approaching or making contact with the detection target, the detection control unit 51 sets a high likelihood threshold such that the countermeasure processing is selectively executed only for a detection target with a high likelihood. Moreover, in the deceleration control range Rb, the detection control unit 51 sets the likelihood threshold to a lower value as the distance from the work vehicle 10 decreases, such that countermeasure processing is more likely to be executed as the distance to the detection target decreases.

The detection control unit 51 sets the information relating to the likelihood threshold (see FIG. 5) according to the distance from the work vehicle 10 to a detection target in advance, and stores the information in the storage unit 52.

The output processing unit 513 refers to the setting information of the likelihood threshold in FIG. 5, and acquires the likelihood threshold corresponding to the distance from the work vehicle 10 to the detection target. For example, when the determination processing unit 512 has determined that the detection target at a position which is a distance Lx from the work vehicle 10 is a person, and the likelihood of a person is calculated to be X1%, the output processing unit 513 outputs, to the vehicle control device 11, a determination result including the type "person" of the detection target, the likelihood "X1%", and the likelihood threshold "Thx" corresponding to the distance Lx.

In this way, while the work vehicle 10 is performing autonomous travel, each time the detection control unit 51 acquires capture images from the camera 53 and acquires measurement information from the obstacle sensor 54, the detection control unit 51 determines the type of the detection target (measurement target) and sequentially outputs the determination results to the vehicle control device 11.

When the vehicle control device 11 acquires the determination result that is output from the obstacle detection device 15 (detection control unit 51), the vehicle control device 11 causes the work vehicle 10 to execute the countermeasure processing corresponding to the determination result.

The vehicle control device 11 includes control apparatuses such as a CPU, a ROM, and a RAM. The CPU is a processor that executes various types of arithmetic processing. The ROM is a non-volatile storage unit that previously stores control programs, such as BIOS and OS, to cause the CPU to execute various arithmetic processes. The RAM is a volatile or non-volatile storage unit that stores various types of information, and is used as a temporary storage memory for various types of processing executed by the CPU. Further, the vehicle control device 11 controls the work vehicle 10 by causing the CPU to execute various control programs stored in advance in the ROM or the storage unit 12.

Specifically, as shown in FIG. 1, the vehicle control device 11 includes various processing units such as a travel processing unit 111 and a countermeasure processing unit 112. Note that the vehicle control device 11 functions as the various processing units as a result of causing the CPU to execute various processing according to the autonomous travel program. In addition, some or all of the processing units may be composed of electronic circuits. Note that the autonomous travel program may be a program for causing the plurality of processors to function as the processing units. In addition, the autonomous travel program includes the vehicle control program of the present invention.

The travel processing unit 111 controls the travel of the work vehicle 10. For example, when the travel mode of the work vehicle 10 is autonomous travel (autonomous travel mode), the travel processing unit 111 causes the work vehicle 10 to perform autonomous travel based on the position information (positioning information) indicating the current position of the work vehicle 10, which is positioned by the positioning unit 17. For example, when the work vehicle 10 satisfies an autonomous travel start condition, and a travel start instruction is acquired from the operator, the travel processing unit 111 causes the work vehicle 10 to start performing autonomous travel based on the positioning information. Furthermore, the travel processing unit 111 causes the work vehicle 10 to perform autonomous travel from a travel start position S to a travel end position G according to a target route R (see FIG. 3) that has been generated and set in advance in the operation terminal 20.

Note that, when the travel mode of the work vehicle 10 is manual travel (manual travel mode), it is possible to make the work vehicle 10 perform manual travel based on operations made by the operator (manual steering). For example, the travel processing unit 111 acquires operation information that corresponds to driving operations performed by the operator, such as steering wheel operations, speed change operations, travel direction switching operations, and braking operations, and causes the travel device 13 to execute travel motions based on the operation information.

The countermeasure processing unit 112 causes the work vehicle 10 to execute predetermined countermeasure processing when an obstacle is detected while the work vehicle 10 is performing autonomous travel. Specifically, the countermeasure processing unit 112 causes the work vehicle 10 to execute the countermeasure processing corresponding to the type of a detection target that has been detected by the obstacle detection device 15. Furthermore, the countermeasure processing unit 112 causes the work vehicle 10 to execute the countermeasure processing corresponding to the type of the detection target that has been detected by the obstacle detection device 15, and the distance to the detection target that has been detected by the obstacle detection device 15.

For example, when the obstacle detection device 15 has detected a detection target while the work vehicle 10 is performing autonomous travel, the obstacle detection device 15 outputs a determination result including the type of the detection target, the likelihood of the type, and the likelihood threshold corresponding to the distance to the detection target (see FIG. 5), and the countermeasure processing unit 112 acquires the determination result. The countermeasure processing unit 112 determines, based on the determination result, whether or not it is necessary to make the work vehicle 10 to execute the countermeasure processing. When the countermeasure processing unit 112 determines that it is necessary to make the work vehicle 10 perform the countermeasure processing, the countermeasure processing unit 112 causes the work vehicle 10 to execute the countermeasure processing. Furthermore, the countermeasure processing unit 112 causes the work vehicle 10 to execute countermeasure processing based on the likelihood calculated by the obstacle detection device 15. A specific example of the countermeasure processing will be described below.

Figure 6:
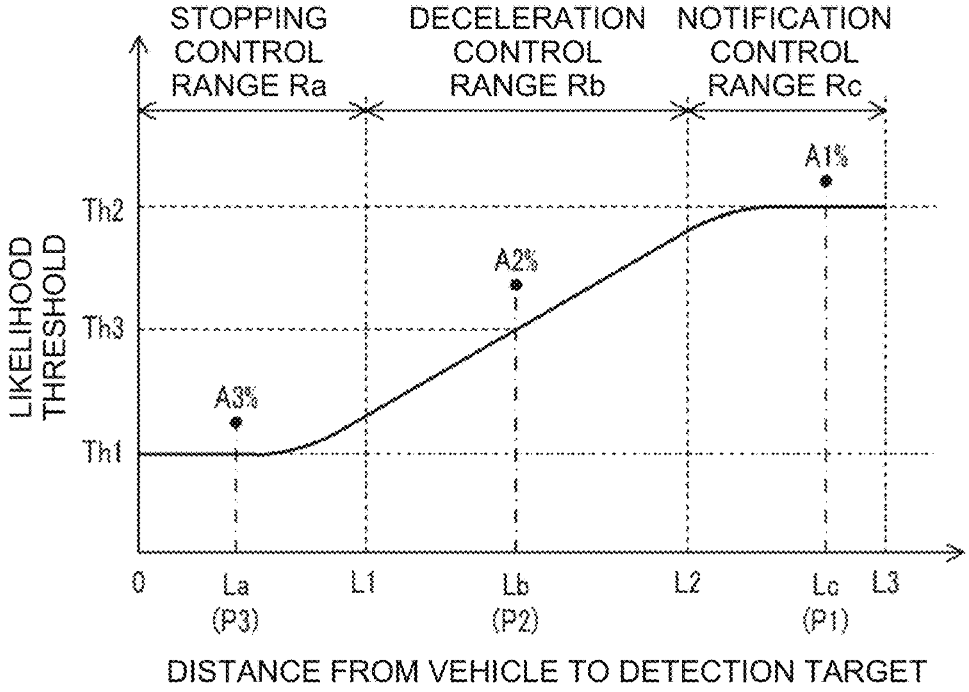
FIG. 6 is a diagram showing an example of countermeasure processing that is executed in the work vehicle according to the embodiment of the present invention.

For example, as shown in FIG. 6, when the obstacle detection device 15 has detected a detection target at a position P1 that is a distance Lc away from the work vehicle 10 (where L2<Lc<L3), has determined that the detection target is a "person", and has calculated the likelihood of a person as "A1" %, if the likelihood "A1" % exceeds the likelihood threshold Th2 corresponding to the distance Lc, the countermeasure processing unit 112 determines that an obstacle has been detected inside the notification control range Rc (see FIG. 4), and causes the work vehicle 10 to perform the notification processing. For example, the countermeasure processing unit 112 causes notification of a warning sound to be provided from the work vehicle 10. As another embodiment, the countermeasure processing unit 112 may cause notification of a warning sound to be provided from the work vehicle 10, and a warning message to be displayed on the operation terminal 20. Furthermore, the countermeasure processing unit 112 may change (such as increase the volume, or shorten the alarm frequency) the warning sound as the distance Lc becomes smaller (as the work vehicle 10 approaches the obstacle). As a result, it is possible to alert the person in front of the work vehicle 10 at an early stage. Consequently, for example, by getting the person to move, it is possible to avoid interruption of the work by the work vehicle 10, and the work can be continued.

Note that, when the likelihood "A1" % is less than or equal to the likelihood threshold Th2, the countermeasure processing unit 112 does not execute the notification processing. As a result, excessive notification processing can be suppressed. In this way, in the notification control range Rc, when the distance from the work vehicle 10 to the detection target is long, there is time before approaching or making contact with the detection target. In this case, because it is only necessary to reliably identify the obstacles to be subjected to the countermeasure processing, excessive notification processing can be suppressed by setting a high likelihood threshold.

Furthermore, for example, as shown in FIG. 6, when the obstacle detection device 15 has detected a detection target at a position P2 that is a distance Lb away from the work vehicle 10 (where L1<Lb<L2), has determined that the detection target is a "person", and has calculated the likelihood of a person as "A2" %, if the likelihood "A2" % exceeds the likelihood threshold Th3 corresponding to the distance Lb, the countermeasure processing unit 112 determines that an obstacle has been detected inside the deceleration control range Rb (see FIG. 4), and causes the work vehicle 10 to perform the deceleration processing. For example, the countermeasure processing unit 112 decelerates the work vehicle 10 that is performing autonomous travel from a vehicle speed that has been set in advance. As another embodiment, the countermeasure processing unit 112 may cause both the deceleration processing and the notification processing to be executed. In addition, the countermeasure processing unit 112 may cause a warning sound to be output that corresponds to the vehicle speed (such as a louder volume at faster vehicle speeds). As a result, it is possible to ensure the safety of the person that is in front of the work vehicle 10.

Note that, when the likelihood "A2" % is less than or equal to the likelihood threshold, the countermeasure processing unit 112 does not execute the deceleration processing. In this way, in the deceleration control range Rb, the likelihood threshold is changed according to the distance. As a result, when the distance from the work vehicle 10 is long, because there is time before approaching or making contact with the detection target, a high likelihood threshold is set to suppress excessive deceleration processing. Further, when the distance from the work vehicle 10 is short, because there is time no time before approaching or making contact with the detection target, it is possible to ensure safety by setting a low likelihood threshold to make it more likely that the deceleration processing is executed.

In addition, for example, as shown in FIG. 6, when the obstacle detection device 15 has detected a detection target at a position P3 that is a distance La away from the work vehicle 10 (where 0<La<L1), has determined that the detection target is a "person", and has calculated the likelihood of a person as "A3" %, if the likelihood "A3" % exceeds the likelihood threshold Th1 corresponding to the distance La, the countermeasure processing unit 112 determines that an obstacle has been detected inside the stopping control range Ra (see FIG. 4), and causes the work vehicle 10 to perform the stopping processing. For example, the countermeasure processing unit 112 temporarily stops the work vehicle 10 while performing autonomous travel. As another embodiment, the countermeasure processing unit 112 may cause both the stopping processing and the notification processing to be executed. As a result, it is possible to ensure the safety of the person that is in front of the work vehicle 10.

Note that, when the likelihood "A3" % is less than or equal to the likelihood threshold, the countermeasure processing unit 112 does not execute the stopping processing. In this way, in the stopping control range Ra, when the distance from the work vehicle 10 is short, because there is no time before approaching or making contact with the detection target, by setting a low likelihood threshold, it is possible to ensure safety by executing the stopping processing with respect to a detection target having a low probability of being an obstacle.

In this way, the countermeasure processing unit 112 causes the work vehicle 10 to execute the countermeasure processing with respect to a detection target that has been detected while the work vehicle 10 is performing autonomous travel when the likelihood of the detection target exceeds the likelihood threshold according to the distance to the detection target.

Here, the countermeasure processing unit 112 omits the countermeasure processing when the detection target is a detection target in which it is not necessary to make the work vehicle 10 execute the countermeasure processing. For example, when the detection target is a work target object (such as a reaping target object or a harvesting target object) of the work vehicle 10, it is not necessary to make the work vehicle 10 execute the countermeasure processing. Therefore, the countermeasure processing unit 112 omits the countermeasure processing. Note that, a configuration is possible in which, when the obstacle detection device 15 determines that the detection target is a detection target in which it is not necessary to make the work vehicle 10 execute the countermeasure processing, a determination result is not output to the vehicle control device 11. The obstacle detection device 15 is capable of determining, based on the capture images, whether or not the detection target is a detection target in which it is necessary to make the work vehicle 10 execute the countermeasure processing. Furthermore, a configuration is possible in which the obstacle detection device 15 determines whether or not the calculated likelihood exceeds the likelihood threshold, outputs the determination result to the vehicle control device 11 when the likelihood exceeds the likelihood threshold, and does not output the determination result to the vehicle control device 11 when the likelihood is less than or equal to the likelihood threshold.

Note that the countermeasure processing may include avoidance travel (avoidance processing) in which the work vehicle 10 avoids the obstacle. For example, when the countermeasure processing unit 112 has executed the notification processing and the deceleration processing, and is still detecting the detection target, or the likelihood exceeds the likelihood threshold, it generates an avoidance route that avoids the detection target and causes the work vehicle 10 to travel on the avoidance route when the distance from the work vehicle 10 to the detection target becomes less than or equal to a predetermined distance. Furthermore, the countermeasure processing unit 112 may determine, based on the type of the detection target, whether to execute the stopping processing or to execute the avoidance processing. For example, the countermeasure processing unit 112 may cause the stopping processing to be executed when the detection target is a moving object (such as a person or a vehicle), and cause the avoidance processing to be executed when the detection target is a fixed object.

In the embodiment described above, the obstacle detection device 15 is configured as a separate device to the vehicle control device 11. However, as another embodiment, the obstacle detection device 15 and the vehicle control device 11 may be configured as an integrated device. Furthermore, the detection control unit 51 may be included in the vehicle control device 11.

Operation Terminal 20

As shown in FIG. 1, the operation terminal 20 is an information processing device including an operation control unit 21, a storage unit 22, an operation display unit 23, a communication unit 24, and the like. The operation terminal 20 may be configured by mobile terminal such as a tablet terminal or a smartphone.

The communication unit 24 is a communication interface that connects the operation terminal 20 to the communication network N1 in a wired or wireless manner, and is for executing data communication according to a predetermined communication protocol with an external apparatus, such as one or more work vehicles 10, via the communication network N1.

The operation display unit 23 is a user interface including a display unit such as a liquid crystal display or an organic EL display, which displays various information, and an operation unit such as a touch panel, a mouse, or a keyboard, which receives operations. The operator is capable of performing, on an operation screen displayed on the display unit, an operation that registers various information (such as the work vehicle information, the field information, and the work information described below) by operating the operation unit. Furthermore, the operator is capable of providing a work start instruction, a work stopping instruction, and the like, to the work vehicle 10 by operating the operation unit. In addition, the operator is capable of grasping, from a position away from the work vehicle 10, the travel state of the work vehicle 10 that is performing autonomous travel along the target route R inside the field F using a travel trajectory displayed on the operation terminal 20, and the capture images of the camera 53 (see FIG. 8). Further, the operator is capable of grasping the obstacle detection result, the execution status of the countermeasure processing, and the like, which are displayed on the operation terminal 20.

The storage unit 22 is a non-volatile storage unit such as an HDD or an SSD that stores various types of information. The storage unit 22 stores control programs for causing the operation control unit 21 to execute various control processing. For example, the control program is non-transiently recorded in a computer-readable recording medium such as a CD or a DVD, is read by a predetermined reading device (not illustrated), and then stored in the storage unit 22. Note that the control program may be downloaded from a server (not illustrated) to the operation terminal 20 via the communication network N1 and stored in the storage unit 22.

The operation control unit 21 includes control apparatuses such as a CPU, a ROM, and a RAM. The CPU is a processor that executes various types of arithmetic processing. The ROM is a non-volatile storage unit that stores, in advance, control programs such as a BIOS and an OS for causing the CPU to execute the various types of the arithmetic processing. The RAM is a volatile or non-volatile storage unit that stores various types of information and is used as a temporary storage memory (work region) for various types of processing executed by the CPU. Then, the operation control unit 21 controls the operation terminal 20 by causing the CPU to execute various types of control programs, which are stored in advance in the ROM or the storage unit 22.

As shown in FIG. 1, the operation control unit 21 includes various processing units such as a setting processing unit 211 and an output processing unit 212. Note that the operation control unit 21 functions as the various processing units by causing the CPU to execute various processing according to the control programs. In addition, some or all of the processing units may be configured with electronic circuits. Note that the control programs may be programs that cause a plurality of processors to function as the processing units.

The setting processing unit 211 sets various types of setting information for causing the work vehicle 10 to perform autonomous travel. Specifically, the setting processing unit 211 sets information about the work vehicle 10 (hereinafter referred to as "work vehicle information"). The setting processing unit 211 sets the information as a result of the operator performing operations that register, in the operation terminal 20, information such as the type (model) of the work vehicle 10, the position in which the positioning antenna 174 is installed in the work vehicle 10, the type of the work machine 14, the size and shape of the work machine 14, the position of the work machine 14 with respect to the work vehicle 10, the vehicle speed and engine rotation speed of the work vehicle 10 during the work, and the vehicle speed and engine rotation speed during the turning of the work vehicle 10.

Figure 7:
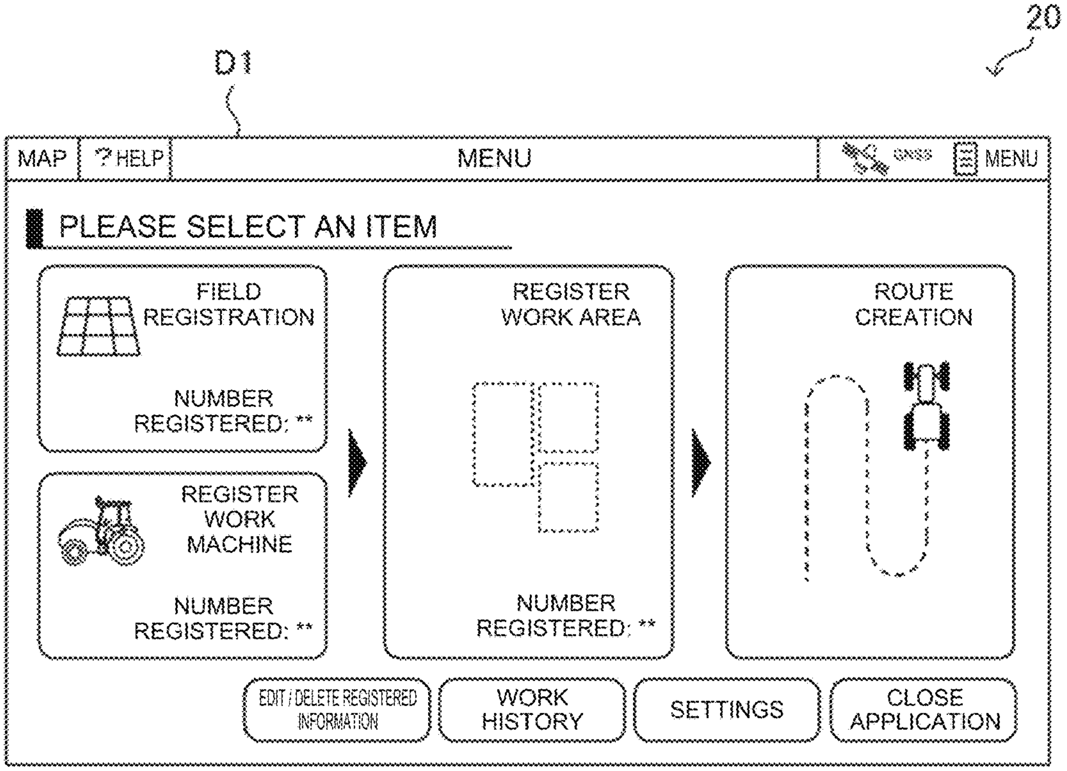
FIG. 7 is a diagram showing an example of a menu screen that is displayed on an operation terminal according to the embodiment of the present invention.

For example, the setting processing unit 211 causes the operation display unit 23 to display a menu screen D1 shown in FIG. 7. The operator selects, for example, "work machine registration" on the menu screen D1 to register work machine information relating to the work machine 14.

The setting processing unit 211 sets information about the field F (hereinafter referred to as "field information"). The setting processing unit 211 sets information such as the position and the shape of the field F, the travel start position S at which the work starts, the travel end position G at which the work ends (see FIG. 3), the work direction, and the like, as a result of a registration operation being performed on the operation terminal 20. Note that the work direction refers to the direction in which the work vehicle 10 is made to travel while performing the work using the work machine 14 in the work area, which is an area obtained by excluding the headland and non-work areas from the field F. For example, the operator registers the field information by selecting "field registration" on the menu screen D1.

The information relating to the position and the shape of the field F can be automatically acquired by, for example, the operator boarding the work vehicle 10 and driving one lap along the outer periphery of the field F, and recording the change in the position information of the positioning antenna 174 at that time. In addition, the position and the shape of the field F can be also acquired based on a polygon obtained as a result of the operator performing an operation on the operation terminal 20 while a map is being displayed on the operation terminal 20, and specifying a plurality of points on the map. The area specified by the acquired position and shape of the field F is an area in which the work vehicle 10 can be made to travel (travel area).

The setting processing unit 211 sets information about specifically how to perform a work (hereinafter referred to as "work information"). The setting processing unit 211 is also configured so as to be capable of setting, as the work information, the presence or absence of cooperative work between unmanned work vehicles 10 and manned work vehicles 10, a skip count, being the number of work routes to be skipped in a case where the work vehicle 10 turns in a headland, the width of the headland, the width of non-cultivated land, and the like. For example, the operator registers the work information by selecting "work registration" on the menu screen D1.

Moreover, based on the setting information, the setting processing unit 211 generates the target route R, which is the route on which the work vehicle 10 is made to perform autonomous travel. The target route R is, for example, a work route from the travel start position S to the travel end position G (see FIG. 3). The target route R shown in FIG. 3 includes straight work routes, along which the work vehicle 10 travel back and forth in parallel in the field F, and turning routes that connect the work routes to each other. The setting processing unit 211 generates and stores the target route R of the work vehicle 10 based on the setting information. For example, the operator selects "route creation" on the menu screen D1, and issues an instruction to generate the target route R. Note that the setting processing unit 211 is capable of generating and storing a plurality of target routes R corresponding to the work content for a single field F.

The output processing unit 212 outputs the route data of the target route R to the work vehicle 10. For example, when the operator selects the desired target route R on the operation screen and issues a work start instruction, the output processing unit 212 outputs the route data of the selected target route R to the work vehicle 10.

The work vehicle 10 is configured such that the route data of the target route R that has been generated in the operation terminal 20 is transferred to the work vehicle 10 and is stored in the storage unit 12, and is capable of performing autonomous travel along the target route R while the current position of the work vehicle 10 is detected by the positioning antenna 174. Note that the current position of the work vehicle 10 usually coincides with the position of the positioning antenna 174.

When the current position of the work vehicle 10 coincides with the travel start position S, and a work start instruction is issued as a result of the operator pressing a work start button on the operation screen, the travel processing unit 111 starts to perform autonomous travel and starts the work using the work machine 14 (see FIG. 2). That is, the operation control unit 21 allows the autonomous travel of the work vehicle 10 to be performed on the condition that the current position coincides with the travel start position S. Note that the condition that allows autonomous travel of the work vehicle 10 to be performed is not limited to the above condition.

The travel processing unit 111 of the work vehicle 10 causes the work vehicle 10 to perform autonomous travel from the travel start position S to the travel end position G according to the target route R acquired from the operation terminal 20.

Furthermore, when the operation control unit 21 acquires a detection result from the work vehicle 10 indicating that an obstacle has been detected, the operation control unit 21 causes a travel screen D2 of the operation terminal 20 (see FIG. 8) to display capture images in which the camera 53 has captured the detection position of the obstacle. As a result, the operator is capable of confirming, on the operation terminal 20, that the work vehicle 10 has detected an obstacle, that the work vehicle 10 has decelerated or stopped, the nature of the obstacle, and the like.

Figure 9:
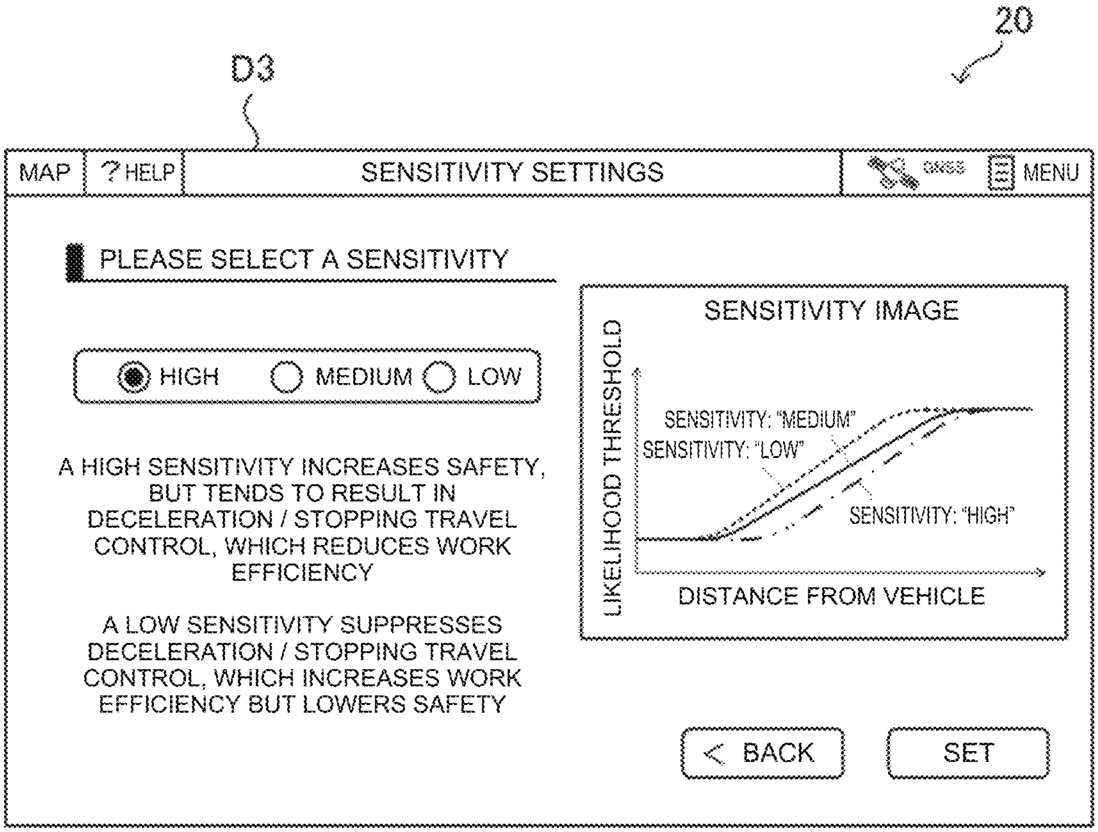
FIG. 9 is a diagram showing an example of a sensitivity setting screen that is displayed on the operation terminal according to the embodiment of the present invention.

Here, the operator may be capable of setting, on the operation terminal 20, a sensitivity, being setting information for making the countermeasure processing more likely to be executed or less likely to be executed. In other words, the sensitivity is a setting parameter that makes the detection target more likely to be recognized as an obstacle or less likely to be recognized as an obstacle. FIG. 9 shows an example of a sensitivity setting screen D3 that receives a sensitivity setting operation. For example, when the sensitivity is set to "high", the likelihood threshold becomes low. As a result, because it becomes more likely for the likelihood to exceed the likelihood threshold even for a detection target with a low likelihood, it becomes more likely for the countermeasure processing (stopping processing, deceleration processing, or notification processing) to be activated, which improves the safety. On the other hand, because it becomes more likely that the countermeasure processing will be excessively executed, the work efficiency decreases. In contrast, when the sensitivity is set to "low", the likelihood threshold becomes high. As a result, because it becomes less likely for the likelihood to exceed the likelihood threshold even for a detection target with a high likelihood, it becomes less likely for the countermeasure processing (stopping processing, deceleration processing, or notification processing) to be activated, which suppresses excessive countermeasure processing and improves the work efficiency. On the other hand, because it becomes less likely that the countermeasure processing will be activated, the safety decreases.

Figure 10A:
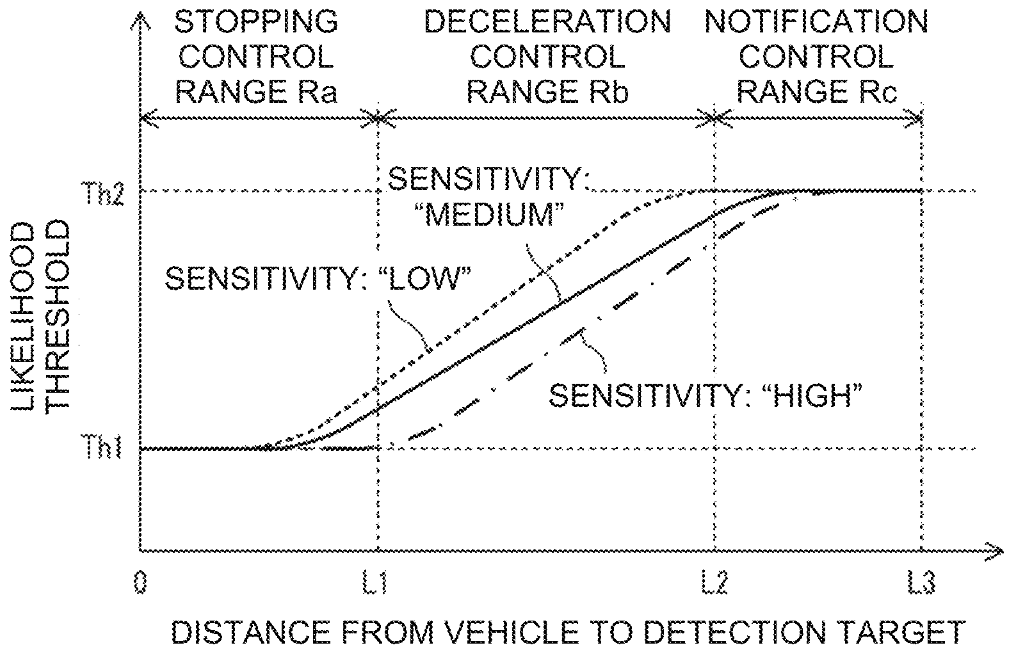
FIG. 10A is a diagram showing an example of likelihood thresholds corresponding to a sensitivity that is used in the autonomous travel system according to the embodiment of the present invention.

The operator is capable of setting the sensitivity according to the intended purpose of the work vehicle 10. The obstacle detection device 15 sets the likelihood threshold according to the sensitivity setting operation performed by the operator. Specifically, as shown in FIG. 10A, information relating to a plurality (three in this case) of likelihood thresholds corresponding to the sensitivity ("high", "medium", and "low") may be registered in advance in the storage unit 52. The obstacle detection device 15 acquires the likelihood threshold corresponding to the sensitivity that has been selected by the operator on the sensitivity setting screen D3 from the storage unit 52.

Figure 10B:
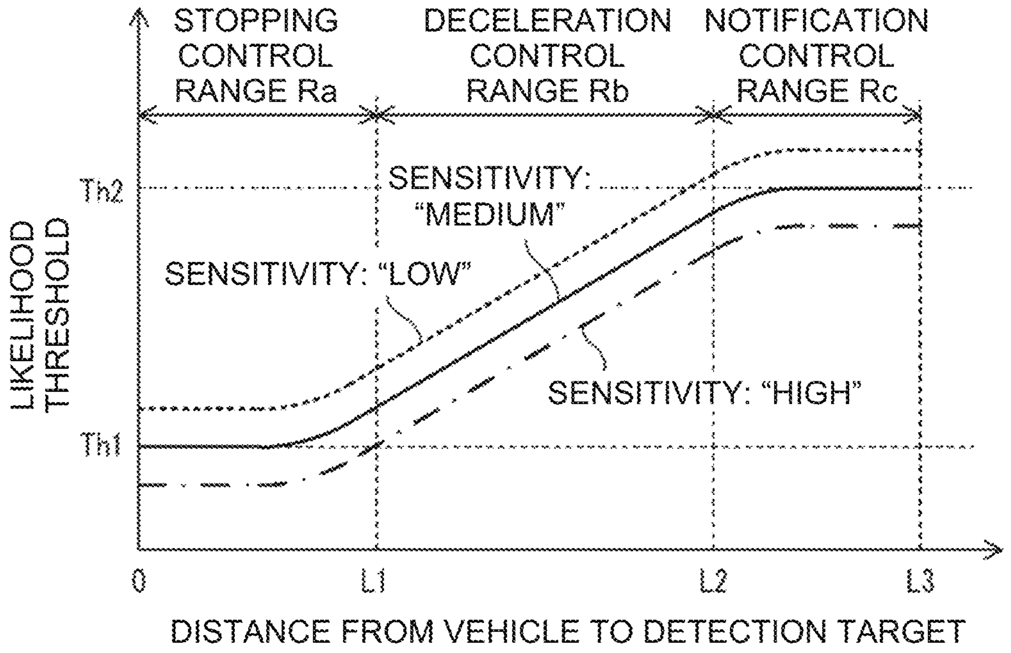
FIG. 10B is a diagram showing an example of likelihood thresholds corresponding to a sensitivity that is used in the autonomous travel system according to the embodiment of the present invention.

As shown in FIG. 10A, in terms of the plurality of likelihood thresholds corresponding to the sensitivity, the likelihood thresholds may be the same in the stopping control range Ra and the notification control range Rc, and the likelihood threshold may be different in the deceleration control range Rb at each sensitivity. As another embodiment, as shown in FIG. 10B, in terms of the plurality of likelihood thresholds corresponding to the sensitivity, the likelihood thresholds may be different in each of the stopping control range Ra, the deceleration control range Rb, and the notification control range Rc at each sensitivity. The obstacle detection device 15 may set the likelihood threshold according to a likelihood threshold setting operation (an input operation of "X" %) performed by the operator.

As another embodiment, the obstacle detection device 15 may automatically set the sensitivity based on the state of the field F, and the work content. That is, the detection control unit 51 may automatically set the likelihood thresholds based on at least one of the state of the field F and the work content performed by the work vehicle 10. For example, when the work vehicle 10 performs grain culm reaping work, in a case where a detection target such as a person becomes hidden by the grain culms, the detection control unit 51 sets a high sensitivity (a low likelihood threshold) in order to increase the safety. Furthermore, for example, when the work vehicle 10 performs cultivation work, and the visibility is good throughout the entire field F, the detection control unit 51 sets a low sensitivity (a high likelihood threshold) in order to increase the work efficiency.

In addition, the detection control unit 51 may set the likelihood thresholds and the sensitivity based on the type of the work machine 14, the work content, and the like, that have been set by the operator on the operation terminal 20, or may set the likelihood thresholds and the sensitivity based on the state of the field F that has been captured by the camera 53. Also, the detection control unit 51 may change the sensitivity based on a sensitivity changing operation performed by the operator after the work vehicle 10 starts to perform autonomous travel. Moreover, the detection control unit 51 may detect a change in the state of the field F from the capture images after the work vehicle 10 starts to perform autonomous travel, and change the likelihood thresholds and the sensitivity based on the change in the state of the field F.

Figure 11:
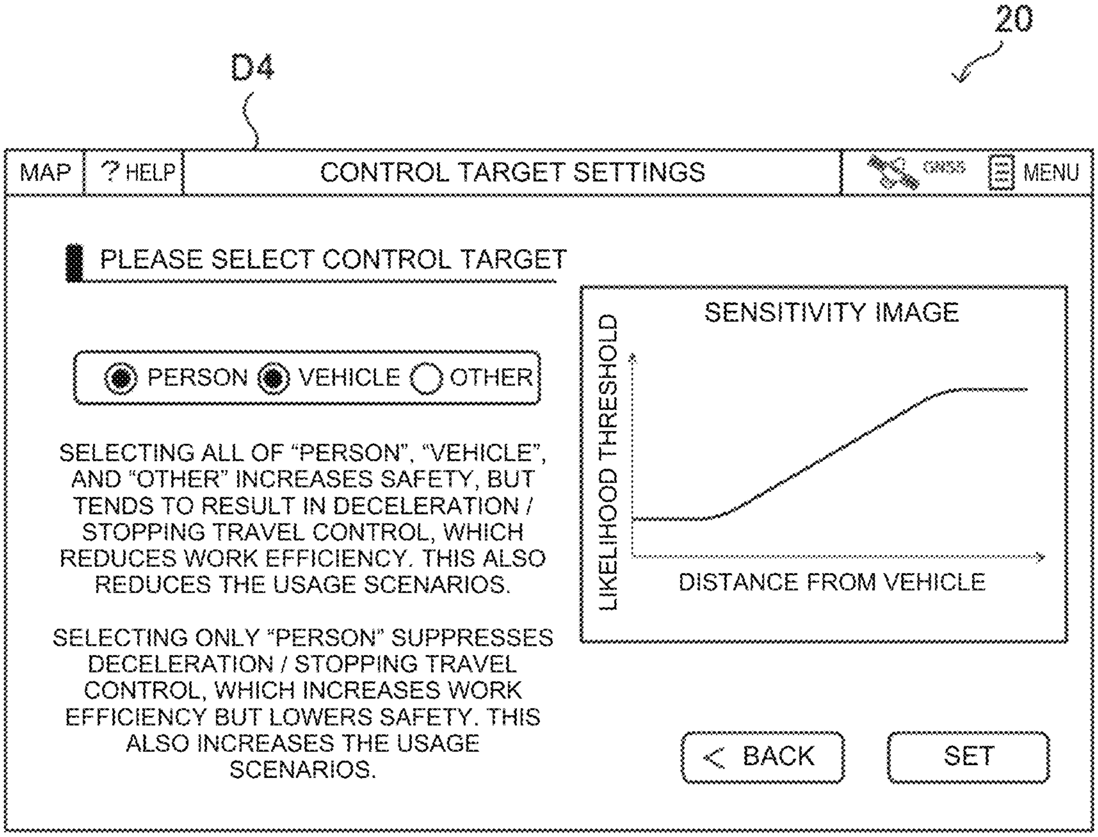
FIG. 11 is a diagram showing an example of a control target setting screen that is displayed on the operation terminal according to the embodiment of the present invention.

Furthermore, the operator may be capable of setting, on the operation terminal 20, the types of detection targets (control targets) for which the countermeasure processing is to be executed. That is, the detection control unit 51 may be capable of setting, for each type of detection target, whether or not to make the work vehicle 10 execute the countermeasure processing. FIG. 11 shows an example of a control target setting screen D4 that receives control target setting operations. For example, the control target setting screen D4 displays "person", "vehicle", and "other", such that each item is selectable. "Other" includes buildings, materials, and the like.

The operator selects one or more types (control targets) among "person", "vehicle", and "other", for which the countermeasure processing is to be executed. Note that, for example, when the operator selects all of "person", "vehicle", and "other", the countermeasure processing becomes more likely to become activated for various detection targets, which improves the safety but results in a reduced work efficiency. Furthermore, for example, when the operator selects only "person", because it becomes less likely for the countermeasure processing to be activated with respect to detection targets other than people, the safety decreases but the work efficiency improves.

The detection control unit 51 executes obstacle detection processing (such as likelihood calculation processing) for the control targets that have been set on the operation terminal 20 by the operator. Furthermore, the countermeasure processing unit 112 executes the countermeasure processing for the control targets that have been set on the operation terminal 20 by the operator. Note that, in an initial setting, all of "person", "vehicle", and "other" may be selected to prioritize safety.

As another embodiment, the detection control unit 51 may be capable of setting the likelihood threshold and the sensitivity for each control target. For example, the detection control unit 51 prioritizes safety and sets a low likelihood threshold (a high sensitivity) with respect to "person", and prioritizes work efficiency and sets a high likelihood threshold (a low sensitivity) with respect to "vehicle" and "other". Furthermore, for example, the detection control unit 51 may set a low likelihood threshold (for example, a setting of 60%) with respect to a "person" and a "vehicle", and may set a high likelihood threshold (for example, a setting of 80%) with respect to "other" obstacles such as animals. Furthermore, as another embodiment, when the operator selects a "safety priority mode", the detection control unit 51 may set the sensitivity to "high", and when the operator selects a "work efficiency priority mode", the detection control unit 51 may set the sensitivity to "low".

Note that the operation terminal 20 may be capable of accessing a website of an agricultural support service (agricultural support site) provided by a server (not illustrated) via the communication network N1. In this case, the operation terminal 20 is capable of functioning as an operation terminal of the server as a result of the operation control unit 21 executing a browser program. In addition, the server is provided with the processing units above, and executes the processing.

Autonomous Travel Processing

Figure 12:
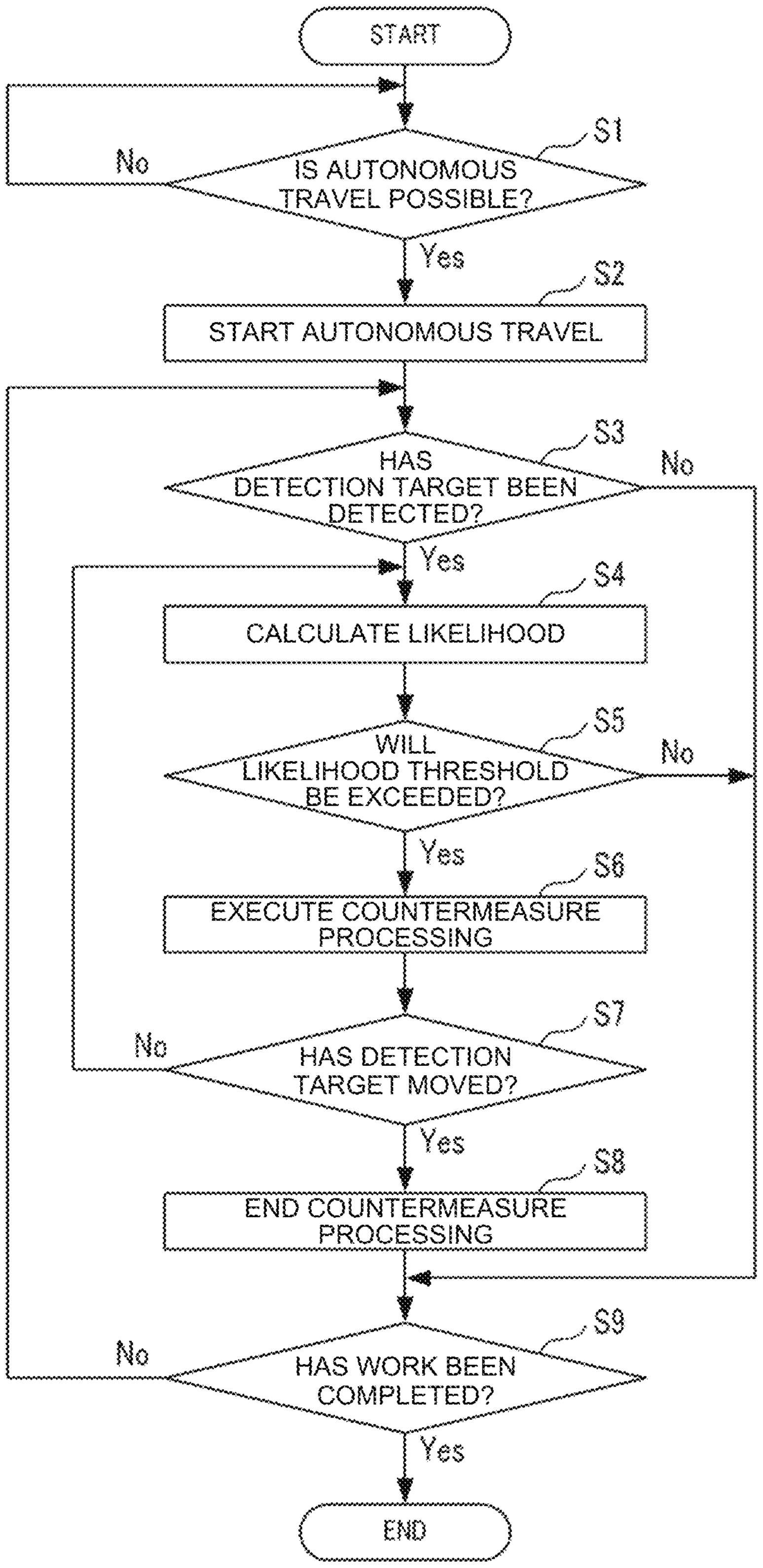
FIG. 12 is a flowchart showing an example of a procedure of autonomous travel processing which is executed by the autonomous travel system according to the embodiment of the present invention.

An example of the autonomous travel processing executed by the vehicle control device 11 and the obstacle detection device 15 will be described below with reference to FIG. 12. For example, the autonomous travel processing is started by the vehicle control device 11 and the obstacle detection device 15 when the work vehicle 10 starts to perform autonomous travel. The autonomous travel processing includes the obstacle detection processing executed by the obstacle detection device 15.

Note that the present invention may be regarded as an invention of an autonomous travel method in which the vehicle control device 11 and the obstacle detection device 15 execute some or all of the autonomous travel processing, or an invention of an autonomous travel program for causing the vehicle control device 11 and the obstacle detection device 15 to execute some or all of the autonomous travel method. Furthermore, one or more processors may execute the autonomous travel processing. The autonomous travel program includes the obstacle detection program.

In step S1, the vehicle control device 11 determines whether or not the work vehicle 10 is in a state capable of performing autonomous travel. When the work vehicle 10 satisfies an autonomous travel start condition (S1: Yes), the vehicle control device 11 shifts the processing to step S2. The vehicle control device 11 waits until the work vehicle 10 satisfies the autonomous travel start condition (S1: No).

In step S2, the vehicle control device 11 causes the work vehicle 10 to start performing autonomous travel. For example, when the operator issues a travel start instruction on the operation screen of the operation terminal 20, the operation control unit 21 outputs the travel start instruction to the work vehicle 10. When the vehicle control device 11 acquires the travel start instruction from the operation terminal 20, the vehicle control device 11 causes the work vehicle 10 to start performing autonomous travel. As a result, the work vehicle 10 starts to perform autonomous travel according to the target route R in the field F (see FIG. 3), and starts the work using the work machine 14.

In step S3, the obstacle detection device 15 determines whether or not a detection target has been detected. Specifically, the obstacle detection device 15 determines the type of the detection target (measurement target) based on the capture images acquired from the camera 53, and the measurement information acquired from the obstacle sensor 54. When the type of the detection target that has been determined is included in the control targets (see FIG. 11) that have been set in advance, the obstacle detection device 15 determines that a detection target has been detected (S3: Yes), and shifts the processing to step S4. When a detection target is not detected, or the type of the detection target that has been determined is not included in the control targets that have been set in advance (S3: No), the obstacle detection device 15 shifts the processing to step S9.

In step S4, the obstacle detection device 15 calculates the likelihood of the detection target that has been determined. For example, when it has been determined based on the capture images that the detection target is a person, the obstacle detection device 15 calculates the likelihood (probability) that indicates the possibility (certainty) of a person based on the distance to the detection target. For example, when it has been determined based on the capture images that the detection target is a vehicle, the obstacle detection device 15 calculates the likelihood that indicates the possibility of a vehicle based on the distance to the detection target. After calculating the likelihood, the obstacle detection device 15 outputs the determination result (the type of the detection target), the likelihood of the determination result, and the likelihood threshold corresponding to the distance to the detection target (see FIG. 5) to the vehicle control device 11. Note that the obstacle detection device 15 may determine the type of the detection target (such as a person or a vehicle) based on the capture images, and calculate the likelihood of the type of the detection target based on the size (such as the occupied area) of the detection target appearing in the capture images.

Next, in step S5, the vehicle control device 11 determines whether the likelihood of the detection target that has been calculated by the obstacle detection device 15 exceeds the likelihood threshold. When the vehicle control device 11 is determined that the likelihood of the detection target exceeds the likelihood threshold (S5: Yes), the vehicle control device 11 shifts the processing to step S6. On the other hand, when the vehicle control device 11 determines that the likelihood of the detection target is less than or equal to the likelihood threshold (S5: No), the vehicle control device 11 shifts the processing to step S9.

In step S6, the vehicle control device 11 causes the work vehicle 10 to execute the countermeasure processing. Specifically, the vehicle control device 11 causes the work vehicle 10 to execute the countermeasure processing (stopping processing, deceleration processing, or notification processing) according to the position of the detection target. For example, when the position of the detection target is in the notification control range Rc (see FIG. 4), the vehicle control device 11 causes the work vehicle 10 to provide notification of a warning sound. Furthermore, for example, when the position of the detection target is in the deceleration control range Rb, the vehicle control device 11 causes the work vehicle 10 to decelerate the vehicle speed. In addition, for example, when the position of the detection target is in the stopping control range Ra, the vehicle control device 11 causes the work vehicle 10 to stop.

Next, in step S7, the vehicle control device 11 determines whether or not the detection target has moved. For example, when the detection target has moved outside the first detection range Rd1 (see FIG. 4), the vehicle control device 11 determines that the detection target has moved (S7: Yes), and shifts the processing to step S8. The vehicle control device 11 repeatedly executes the processing of steps S4 to S6 while the detection target is positioned inside the first detection range Rd1 (S7: No).

In step S8, the vehicle control device 11 ends the countermeasure processing. For example, when the detection target positioned inside the notification control range Rc moves outside the first detection range Rd1, the vehicle control device 11 stops the notification processing. Furthermore, for example, when the detection target positioned inside the deceleration control range Rb moves outside the first detection range Rd1, the vehicle control device 11 returns the vehicle speed of the work vehicle 10 to the original vehicle speed. In addition, for example, when the detection target positioned inside the stopping control range Ra moves outside the first detection range Rd1, the vehicle control device 11 releases the temporary stopping of the work vehicle 10 and resumes autonomous travel.

Then, in step S9, the vehicle control device 11 determines whether or not the work vehicle 10 has finished the work. For example, when the work vehicle 10 has arrived at the travel end position G (see FIG. 3), the vehicle control device 11 determines that the work vehicle 10 has finished the work (S9: Yes) and ends the autonomous travel processing. The vehicle control device 11 repeatedly executes the above processing until the work vehicle 10 reaches the travel end position G (S9: No). The vehicle control device 11 and the obstacle detection device 15 execute the autonomous travel processing in the manner described above.

As described above, in the autonomous travel system 1 according to the present embodiment, when the work vehicle 10 is performing autonomous traveling according to the target route R, distance information relating to the distance to the detection target that is detected by the obstacle sensor 54 is acquired, and image information relating to the capture images of the detection target that are captured by a camera 53 is acquired. Furthermore, the autonomous travel system 1 determines the type of a detection target based on the image information, and causes the work vehicle 10 to execute the countermeasure processing according to the type of the detection target. In addition, the autonomous travel system 1 causes the work vehicle 10 to execute the countermeasure processing according to the type of the detection target and the distance information.

Moreover, in the autonomous travel system 1, the likelihood of the type of a detection target is calculated based on the image information, and causes the work vehicle 10 to execute the countermeasure processing when the calculated likelihood exceeds the likelihood threshold (see FIG. 5). Note that, in the autonomous travel system 1, the type of a detection target may be determined based on the image information and the distance information. In addition, in the autonomous travel system, the likelihood of the type of a detection target may be calculated based on the image information and the distance information.

Furthermore, in the autonomous travel system 1, the likelihood threshold may be set to a smaller value as the distance from the work vehicle 10 to a detection target becomes shorter.

According to the configuration above, the countermeasure processing is omitted when the detection target is a detection target in which it is not necessary to make the work vehicle 10 execute the countermeasure processing (such as a work target object), and it is possible to execute the countermeasure processing when the detection target is a detection target in which it is necessary to make the work vehicle 10 execute the countermeasure processing (such as a person or a vehicle). As a result, it is possible to prevent a reduction in the work efficiency of the work vehicle 10, while causing the work vehicle 10 to execute appropriate countermeasure processing with respect to the obstacle.

Furthermore, according to the configuration above, for example, in the notification control range Rc, which is far away from the work vehicle 10, the work efficiency is prioritized, and the work vehicle 10 is made to execute the countermeasure processing (notification processing) when the likelihood of the detection target is high (see FIGS. 5 and 6). Moreover, for example, in the stopping control range Ra, which is close to the work vehicle 10, the safety is prioritized, and the work vehicle 10 is made to execute the countermeasure processing (stopping processing) even when the likelihood of the detection target is low. In addition, for example, in the deceleration control range Rb, it is possible to make it more likely for countermeasure processing (deceleration processing) to be executed as the distance decreases, and to make it less likely for countermeasure processing (deceleration processing) to be executed as the distance increases.

Figure 13A:
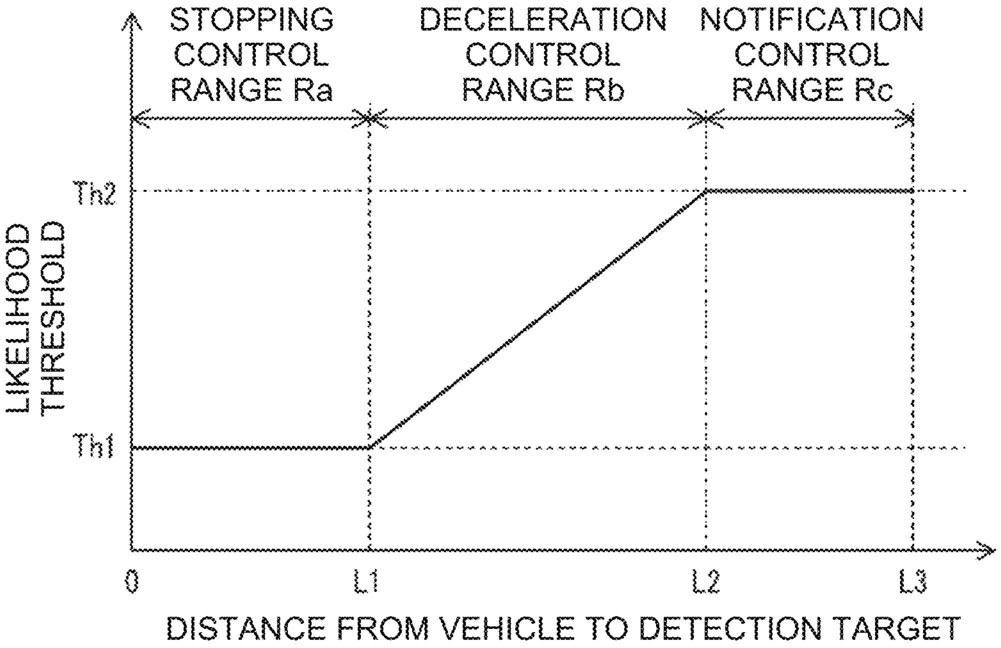
FIG. 13A is a diagram showing another example of likelihood thresholds that are used in the autonomous travel system according to the embodiment of the present invention.

The present invention is not limited to the embodiment described above, and may also include the following embodiments. In the embodiment described above, as shown in FIG. 6, the likelihood threshold is set so as to linearly change in the deceleration control range Rb (distance L1 to L2). As another embodiment, as shown in FIG. 13A, the likelihood threshold may be set to a constant value (Th1) in the stopping control range Ra (distance 0 to L1), and set to a constant value (Th2) in the notification control range Rc (distance L2 to L3). Furthermore, the likelihood threshold at the distance L1 in the stopping control range Ra may be set to Th1, the likelihood threshold at the distance L2 in the notification control range Rc may be set to Th2, and the likelihood threshold in the deceleration control range Rb (distance L1 to L2) may be set to linearly change between Th1 and Th2.

Figure 13B:
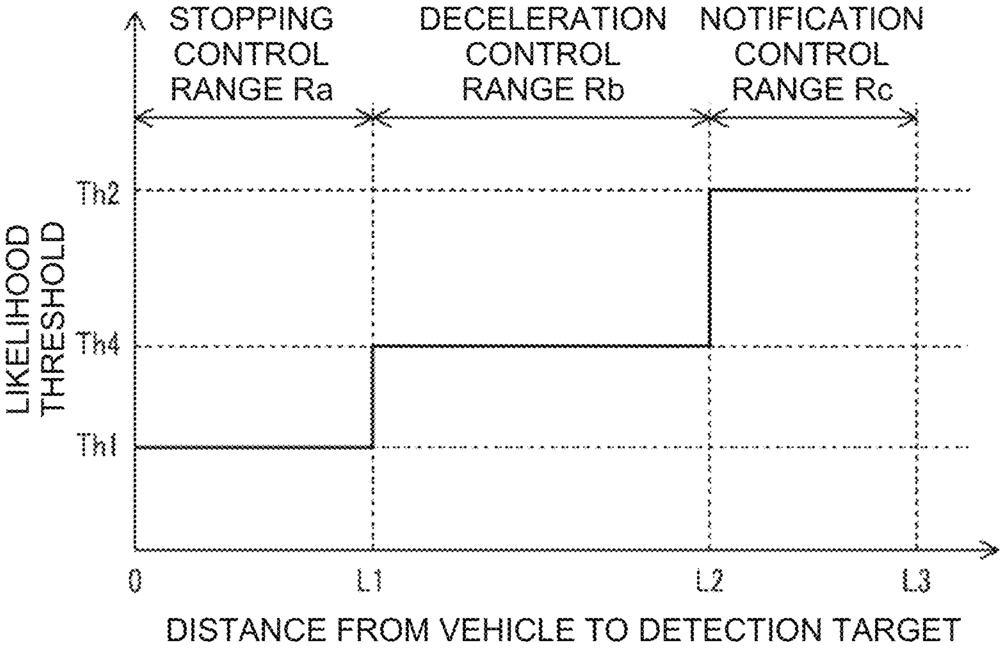
FIG. 13B is a diagram showing another example of likelihood thresholds that are used in the autonomous travel system according to the embodiment of the present invention.

Furthermore, as shown in FIG. 13B, the likelihood threshold may be set to three levels. For example, the likelihood threshold may be set to Th1 in the stopping control range Ra (distance 0 to L1), the likelihood threshold may be set to Th4 (where Th1<Th4<Th2) in the deceleration control range Rb, and the likelihood threshold may be set to Th2 in the notification control range Rc (distance L2 to L3).

In addition, the likelihood threshold may be set to linearly change in the entire range (distance 0 to L3) from the stopping control range Ra, the deceleration control range Rb, to the notification control range Rc.

Figure 13C:
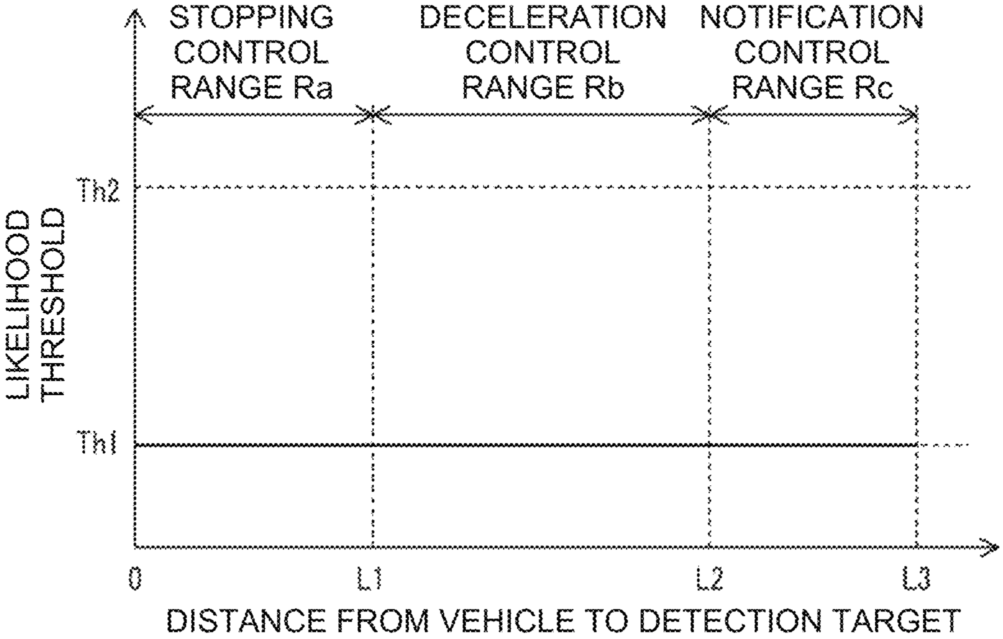
FIG. 13C is a diagram showing another example of likelihood thresholds that are used in the autonomous travel system according to the embodiment of the present invention.

Furthermore, in the embodiment described above, the likelihood threshold is set according to the distance from the work vehicle 10 to a detection target. As another embodiment, as shown in FIG. 13 C, the likelihood threshold may be set to a constant value (such as Th1) in the entire range (distance 0 to L3) from the stopping control range Ra, the deceleration control range Rb, to the notification control range Rc. For example, the detection control unit 51 may set a low likelihood threshold when the safety is to be prioritized, and set a high likelihood threshold when work efficiency is to be prioritized. In addition, the detection control unit 51 may set the likelihood threshold to a fixed value for each state of the field F, work content, and control target.

Moreover, as another embodiment, a mode is possible in which the autonomous travel system 1 does not use the likelihood information described above. For example, in the autonomous travel system 1, the operator may be capable of setting the content of countermeasure processing according to the distance (range) for each type of detection target. For example, the operator sets, on a setting screen, the countermeasure processing (such as stopping processing, deceleration processing, and notification processing) corresponding to the distance to the detection target for each type (a person, a vehicle, or other) of detection target (control target). As a result, for example, when the distance to the detection target is L0, it is possible for the countermeasure processing to be changed according to the type of the detection target and the distance, such as causing the work vehicle 10 to stop if the detection target is a person, and causing the work vehicle 10 to decelerate if the detection target is a vehicle. Note that, in this case, the operator may be capable of setting distance thresholds (the range of each countermeasure processing) for each type of detection target.

In addition, as another embodiment, the autonomous travel system 1 may execute the countermeasure processing corresponding to a detection target that is close to the work vehicle 10. Specifically, the autonomous travel system 1 executes the countermeasure processing if a detection target is detected whose distance from the work vehicle 10 is less than a predetermined distance, and does not execute the countermeasure processing if a detection target is detected whose distance from the work vehicle 10 is greater than or equal to the predetermined distance.

Furthermore, as another embodiment, the autonomous travel system 1 may set a priority according to the type of a detection target. For example, the autonomous travel system 1 sets the priority of a person higher than the priority of a vehicle. In this case, when the autonomous travel system 1 detects a person and a vehicle at positions that are at the same distance, the autonomous travel system 1 executes the countermeasure processing corresponding to the detection target having a higher priority. Here, the autonomous travel system 1 executes the countermeasure processing that is set to a person. Note that, in this case, the operator may be capable of setting a priority for each type of detection target.

Other Setting Methods of Likelihood Threshold

Specific examples of other setting methods of the likelihood threshold (a first setting method to a third setting method) will be described below.

First Setting Method

Figure 14:
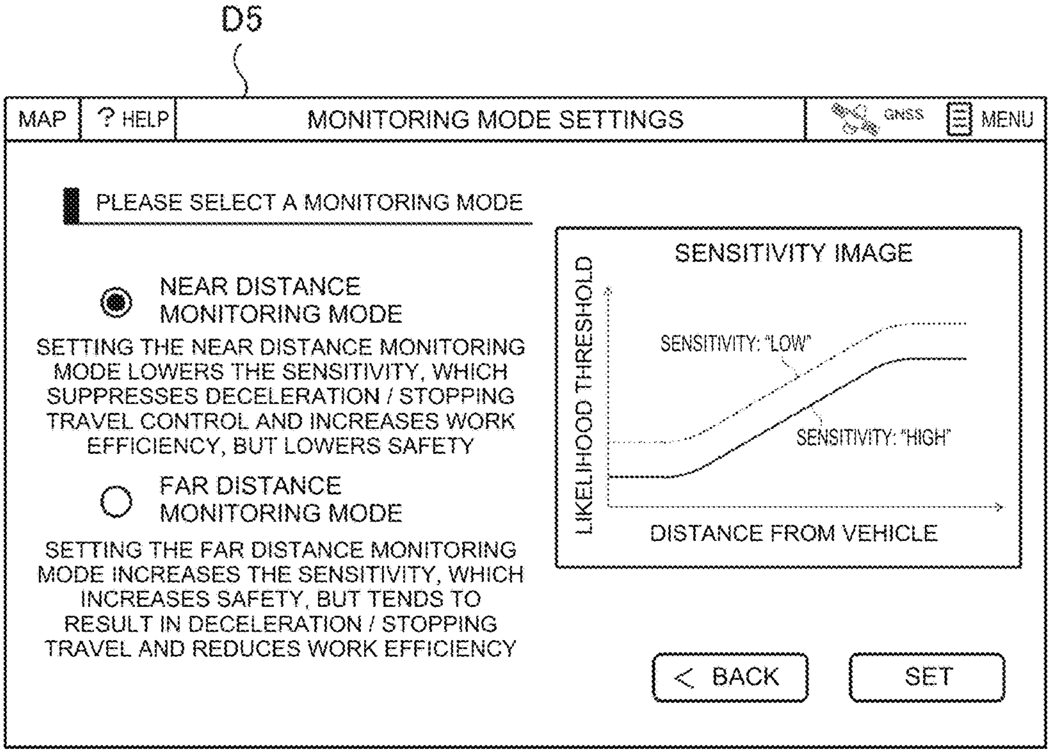
FIG. 14 is a diagram showing an example of a monitoring mode setting screen that is displayed on the operation terminal according to the embodiment of the present invention.

In the first setting method, the detection control unit 51 sets the likelihood threshold according to the setting content of a monitoring mode in the autonomous travel mode. Specifically, the work vehicle 10 includes a short-distance mode (short-distance monitoring mode) in which it is possible to control the motion of the work vehicle 10 within a predetermined range from the work vehicle 10, and a long-distance mode (long-distance monitoring mode) in which it is possible to control (possible to operate via a cloud connection) the motion of the work vehicle 10 via the communication network N1 (such as the Internet). Further, the vehicle control device 11 is capable of setting and switching between the short-distance mode and the long-distance mode. Note that the short-distance mode may be a monitoring mode in which it is possible to control the motion of the work vehicle 10 by short-distance communication, and the long-distance mode may be a monitoring mode in which it is possible to control the motion of the work vehicle 10 by long-distance communication. Furthermore, the short-distance mode may be a remote control mode, and the long-distance mode may be a smartphone mode. In addition, the vehicle control device 11 is capable of controlling the motion of the work vehicle 10 according to the monitoring mode that has been set. For example, the operator is capable of selecting the short-distance mode or the long-distance mode on an operation device (on-board monitor) that is fixed to the inside of the cabin 138 of the work vehicle 10, or on a setting screen D5 of the operation terminal 20 that the operator has brought into the cabin 138. FIG. 14 shows an example of the setting screen D5. The vehicle control device 11 sets the monitoring mode that has been selected by the operator, and executes the processing according to the monitoring mode that has been set.

For example, when the vehicle control device 11 is set to the short-distance mode, the operator is capable of performing, on a mobile terminal such as a smartphone, a tablet terminal, or a remote control, operations such as starting/stopping the autonomous travel of the work vehicle 10, operating the vehicle speed of the work vehicle 10, setting/changing the engine rotation speed, and raising/lowering the work machine 14. On the other hand, when the vehicle control device 11 is set to the long-distance mode, the operator is capable of performing, on a mobile terminal such as a smartphone, a tablet terminal (operation terminal 20), or a personal computer, remote operations such as checking a camera image while performing autonomous travel, stopping the autonomous travel of the work vehicle 10, operating the vehicle speed of the work vehicle 10, setting/changing the engine rotation speed, and raising/lowering the work machine 14.

The detection control unit 51 sets the likelihood threshold depending on whether the monitoring mode is set to the short-distance mode or set to the long-distance mode. For example, when the monitoring mode is set to the short-distance mode, the detection control unit 51 sets the likelihood threshold to a high value, and makes it less likely that a detection target will be recognized as an obstacle (lowers the sensitivity). In this case, when it is determined with certainty by the detection control unit 51 that a detection target is an obstacle (such as a person or a vehicle), that is, when a detection target with a high likelihood has been detected, the vehicle control device 11 executes the countermeasure processing (stopping processing, deceleration processing, or notification processing). As a result, in the case of the short-distance mode, the work efficiency can be increased while ensuring the safety.

In contrast, when the monitoring mode is set to the long-distance mode, the detection control unit 51 sets the likelihood threshold to a low value, and makes it more likely that a detection target will be recognized as an obstacle (increases the sensitivity). In this case, when it is determined by the detection control unit 51 that a detection target seems to be an obstacle (such as a person or a vehicle), that is, when a detection target with a low likelihood has been detected, the vehicle control device 11 executes the countermeasure processing (stopping processing, deceleration processing, or notification processing). As a result, in the case of the long-distance mode, autonomous travel can be performed with increased safety.

Second Setting Method

In the second setting method, the detection control unit 51 sets the likelihood threshold according to the position of a detection target. Specifically, the detection control unit 51 sets a different likelihood threshold when a detection target is positioned inside the field, and when a detection target is positioned outside the field. For example, the detection control unit 51 sets (registers) in advance a first likelihood threshold that is applied when a detection target is detected inside the field, and a second likelihood threshold that is applied when a detection target is detected outside the field. Furthermore, the detection control unit 51 sets the second likelihood threshold to a higher value than the first likelihood threshold. That is, the detection control unit 51 sets the first likelihood threshold to a low value (sets a high sensitivity) such that a detection target is more likely to be recognized as an obstacle, and sets the second likelihood threshold to a high value (sets a low sensitivity) such that a detection target is less likely to be recognized as an obstacle.

When the work vehicle 10 detects a detection target while performing autonomous travel, the detection control unit 51 determines whether or not the detection target is positioned inside the field F or positioned outside the field F based on the distance from the work vehicle 10 to the detection target and the external shape data (map information) of the field F. When the detection control unit 51 determines that the detection target is positioned inside the field F, the detection control unit 51 determines whether or not the detection target is an obstacle based on the first likelihood threshold. Specifically, the detection control unit 51 determines that the detection target is an obstacle when the likelihood of the detection target exceeds the first likelihood threshold. In contrast, when the detection control unit 51 determines that the detection target is positioned outside the field F, the detection control unit 51 determines whether or not the detection target is an obstacle based on the second likelihood threshold. Specifically, the detection control unit 51 determines that the detection target is an obstacle when the likelihood of the detection target exceeds the second likelihood threshold.

When it is determined by the detection control unit 51 that a detection target is an obstacle, the vehicle control device 11 executes the countermeasure processing (stopping processing, deceleration processing, or notification processing). According to the configuration above, because it becomes less likely for the countermeasure processing to be executed even when a detection target positioned outside the field has been detected, for example, it is possible to reduce the notification frequency and to avoid unnecessary travel control (deceleration or stopping) with respect to a detection target positioned outside the field F, which has a low possibility of making contact with the work vehicle 10. Therefore, it is possible to reduce the effort of the confirmation work by the operator, which also enables the work efficiency to be increased. Note that, when the likelihood of a detection target that has been detected outside the field exceeds the second likelihood threshold, that is, when an obstacle positioned outside the field has been detected, the vehicle control device 11 may not execute stopping processing and deceleration processing, and only execute notification processing (such as providing notification of a warning sound from the work vehicle 10 to the surroundings, or providing notification of a warning message on the operation terminal 20). Furthermore, in the notification processing, the vehicle control device 11 may change the notification mode (such as increasing the volume, shortening the alarm frequency, increasing the notification frequency of the warning message, or more prominently displaying the warning message) as the distance to the obstacle becomes smaller (as the work vehicle 10 approaches the obstacle).

Third Setting Method

Figure 15:
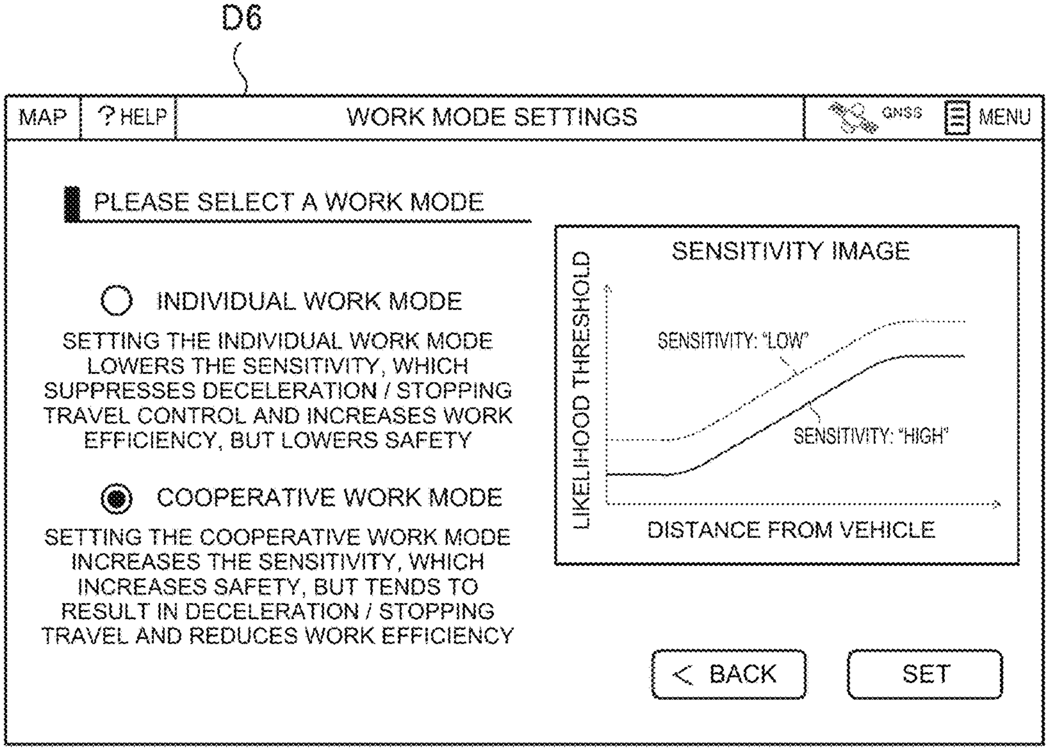
FIG. 15 is a diagram showing an example of a work mode setting screen that is displayed on the operation terminal according to the embodiment of the present invention.

In the third setting method, the detection control unit 51 sets the likelihood threshold according to a work mode (an individual work mode or a cooperative work mode). Specifically, the operator is capable of selecting whether the work in a single field F is executed by a single work vehicle 10 (individual work mode), or the work is executed by a plurality of work vehicles 10 (cooperative work mode). In the individual work mode, a single work vehicle 10 performs autonomous travel and the work in the field F. In the cooperative work mode, a plurality of work vehicles 10 cooperatively perform autonomous travel and the work in the field F. For example, the operator is capable of selecting the individual work mode or the cooperative work mode on an operation device (on-board monitor), or on a setting screen D6 of the operation terminal 20. FIG. 15 shows an example of the setting screen D6. The vehicle control device 11 sets the work mode that has been selected by the operator, and executes the processing according to the work mode that has been set.

The detection control unit 51 sets the likelihood threshold depending on whether the monitoring mode is set to the individual work mode or set to the cooperative work mode. For example, when the individual work mode is set, the detection control unit 51 sets the likelihood threshold to a high value, and makes it less likely that a detection target will be recognized as an obstacle (lowers the sensitivity). In this case, when it is determined with certainty by the detection control unit 51 that a detection target is an obstacle (such as a person or a vehicle), that is, when a detection target with a high likelihood has been detected, the vehicle control device 11 executes the countermeasure processing (stopping processing, deceleration processing, or notification processing). As a result, in the case of the individual work mode, the work efficiency can be increased while ensuring the safety.

In contrast, when the work mode is set to the cooperative work mode, the detection control unit 51 sets the likelihood threshold to a low value, and makes it more likely that a detection target will be recognized as an obstacle (increases the sensitivity). In this case, when it is determined by the detection control unit 51 that a detection target seems to be an obstacle (such as a person or a vehicle), that is, when a detection target with a low likelihood has been detected, the vehicle control device 11 executes the countermeasure processing (stopping processing, deceleration processing, or notification processing). As a result, in the case of the cooperative work mode, because it is easier to recognize the other work vehicles 10, it is possible to perform autonomous travel with enhanced safety.

Note that, as another embodiment of the third setting method, the detection control unit 51 may set the likelihood threshold to a low value (set a high sensitivity) when the individual work mode is set, and set the likelihood threshold to a high value (set a low sensitivity) when the cooperative work mode is set. As a result, for example, because it is less likely for countermeasure processing to be executed in the cooperative work mode, the work efficiency of the cooperative work can be increased. Note that, in the cooperative work mode, because the travel routes (target routes) are set such that the plurality of work vehicles 10 do not make contact with each other, it is possible to ensure the safety even when a low sensitivity is set.

Figure 16:
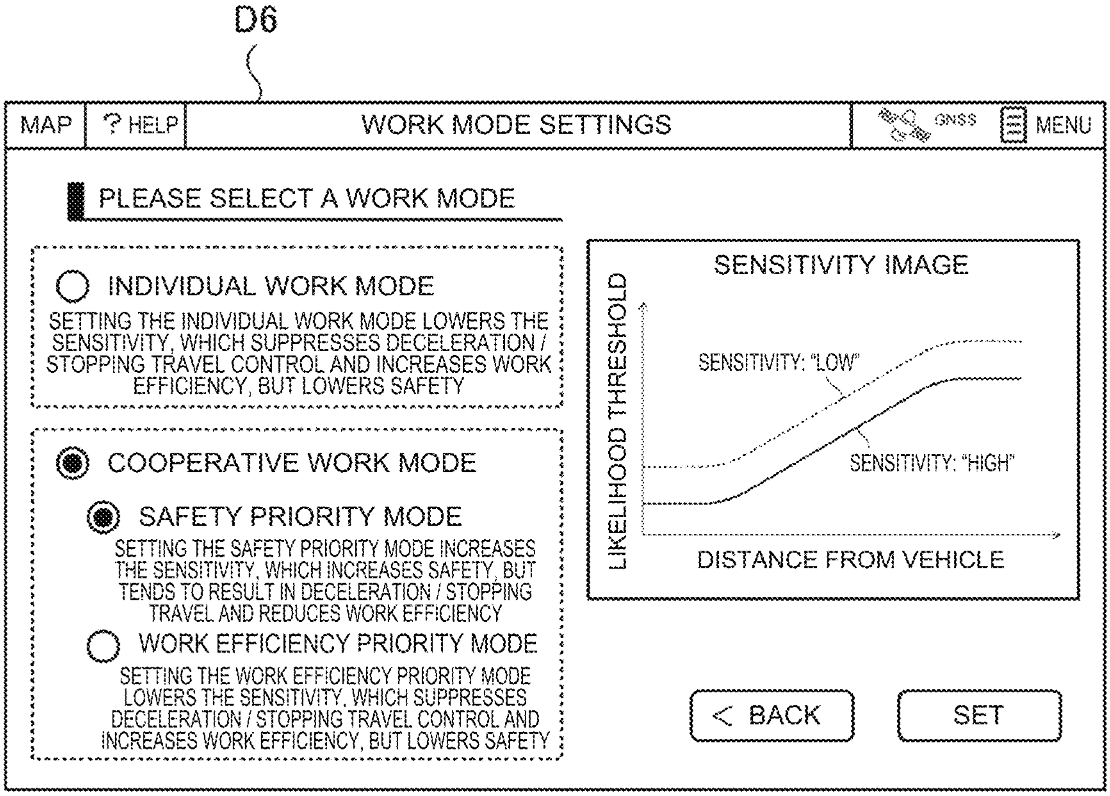
FIG. 16 is a diagram showing an example of a work mode setting screen that is displayed on the operation terminal according to the embodiment of the present invention.

Furthermore, as another embodiment of the third setting method, when the operator has selected the cooperative work mode, the detection control unit 51 may receive a selection operation of a priority mode in the cooperative work on the setting screen D6 shown in FIG. 16. For example, in the cooperative work mode, the operator is capable of selecting a "safety priority mode" that prioritizes the safety, and a "work efficiency priority mode" that prioritizes the work efficiency. The detection control unit 51 sets a high sensitivity when the operator selects the "safety priority mode", and sets a low sensitivity when the operator selects the "work efficiency priority mode".

Note that the detection control unit 51 may set the likelihood threshold of the work efficiency priority mode in the cooperative work mode to a lower value (set a higher sensitivity) than the likelihood threshold in the individual work mode. That is, the detection control unit 51 may set the magnitude of the likelihood threshold of the work mode so as to satisfy the relational expression: "likelihood threshold of cooperative work mode/safety priority mode"<"likelihood threshold of cooperative work mode/work efficiency priority mode"<"likelihood threshold of individual work mode".

In addition, the detection control unit 51 may set the likelihood threshold of the work efficiency priority mode in the cooperative work mode to a higher value (set a lower sensitivity) than the likelihood threshold in the individual work mode. That is, the detection control unit 51 may set the magnitude of the likelihood threshold of the work mode so as to satisfy the relational expression: "likelihood threshold of cooperative work mode/safety priority mode"<"likelihood threshold of individual work mode"<"likelihood threshold of cooperative work mode/work efficiency priority mode".

As another example of the setting method of the likelihood threshold, the detection control unit 51 may set the likelihood threshold according to the position of the operator with respect to the work vehicle 10. Specifically, when the operator is positioned within a predetermined distance from the work vehicle 10, because the operator is capable of visually determining the obstacles, the detection control unit 51 sets the likelihood threshold to a high value (sets a low sensitivity). In contrast, when the operator is positioned beyond the predetermined distance from the work vehicle 10, because it is difficult for the operator to visually determine the obstacles, the detection control unit 51 sets the likelihood threshold to a low value (sets a high sensitivity). Note that the detection control unit 51 may set the likelihood threshold according to the distance, such as setting the likelihood threshold to a lower value as the distance between the work vehicle 10 and the operator increases.

SUPPLEMENTARY NOTES OF INVENTION

Hereinafter, a summary of the invention extracted from the embodiments above will be described. Note that each configuration and each processing function described in the supplementary notes below may be selected, omitted, and combined as appropriate.

Supplementary Note 1

A vehicle control method that executes:

acquiring, when a work vehicle performs autonomous travel according to a target route, distance information relating to a distance to a detection target that is detected by a detection unit;

acquiring image information relating to a capture image of the detection target that is captured by an imaging unit;

determining a type of the detection target based on the image information; and causing the work vehicle to execute countermeasure processing according to the type of the detection target and the distance information.

Supplementary Note 2

The vehicle control method according to supplementary note 1, wherein a likelihood of the type of the detection target is calculated based on the image information, and the work vehicle is made to execute the countermeasure processing based on the calculated likelihood.

Supplementary Note 3

The vehicle control method according to supplementary note 1, wherein a likelihood of the type of the detection target is calculated based on the image information and the distance information, and the work vehicle is made to execute the countermeasure processing based on the calculated likelihood.

Supplementary Note 4

The vehicle control method according to supplementary note 3, wherein the likelihood is calculated such that the likelihood increases as the distance becomes shorter.

Supplementary Note 5

The vehicle control method according to supplementary note 2, wherein the work vehicle is made to execute the countermeasure processing when the likelihood exceeds a threshold.

Supplementary Note 6

The vehicle control method according to supplementary note 5, wherein the threshold is set to a smaller value as the distance becomes shorter.

Supplementary Note 7

The vehicle control method according to supplementary note 6, wherein the threshold is set to a different value depending on a content of the countermeasure processing.

Supplementary Note 8

The vehicle control method according to supplementary note 7, wherein the threshold is set to a first threshold when the countermeasure processing is processing that causes the work vehicle to stop while performing autonomous travel, and the threshold is set to a second threshold, which is larger than the first threshold, when the countermeasure processing is processing that causes the work vehicle to decelerate while performing autonomous travel, or processing that provides notification of warning information from the work vehicle.

Supplementary Note 9

The vehicle control method according to any one of supplementary notes 6 to 8, wherein a sensitivity, being setting information for making the countermeasure processing more likely to be executed or less likely to be executed, can be set, and the threshold is additionally set according to the sensitivity.

Supplementary Note 10

The vehicle control method according to supplementary note 9, wherein the sensitivity is set according to a user operation.

Supplementary Note 11

The vehicle control method according to any one of supplementary notes 6 to 8, wherein the threshold is set based on at least one of a state of a work area in which the work vehicle performs autonomous travel, and a work content performed by the work vehicle.

Supplementary Note 12

The vehicle control method according to any one of supplementary notes 5 to 8, wherein the threshold is set according to a type of the detection target.

Supplementary Note 13

The vehicle control method according to any one of supplementary notes 5 to 8, wherein the work vehicle includes a short-distance mode in which it is possible to control a motion of the work vehicle within a predetermined range, and a long-distance mode in which it is possible to control a motion of the work vehicle from outside the predetermined range, and the threshold is set to one of a threshold corresponding to the short-distance mode and a threshold corresponding to the long-distance mode.

Supplementary Note 14

The vehicle control method according to any one of supplementary notes 5 to 8, wherein the threshold is set to a different value depending on whether the detection target is positioned inside a work area in which the work vehicle is performing autonomous travel, or the detection target is positioned outside the work area.

Supplementary Note 15

The vehicle control method according to any one of supplementary notes 5 to 8, wherein the work vehicle includes an individual work mode in which work is performed individually, and a cooperative work mode in which work is performed cooperatively with another work vehicle, and the threshold is set to one of a threshold corresponding to the individual work mode and a threshold corresponding to the cooperative work mode.

Supplementary Note 16

The vehicle control method according to any one of supplementary notes 1 to 15, wherein for each type of the detection target, it is possible to set whether or not to make the work vehicle perform the countermeasure processing.

REFERENCE SIGNS LIST

1 Autonomous travel system
10 Work vehicle
11 Vehicle control device

14 Work machine
15 Obstacle detection device
20 Operation terminal
51 Detection control unit
52 Storage unit
53 Camera (imaging unit)
54 Obstacle sensor (detection unit)
111 Travel processing unit
112 Countermeasure processing unit
211 Setting processing unit
212 Output processing unit
511 Acquisition processing unit
512 Determination processing unit
513 Output processing unit
F Field
R Target route
Ra Stopping control range
Rb Deceleration control range
Rc Notification control range
Rd1 First detection range
Rd2 Second detection range
Rm1 First measurement range
Rm2 Second measurement range
Th1 Likelihood threshold (threshold)
Th2 Likelihood threshold (threshold)
Th3 Likelihood threshold (threshold)

The invention claimed is:

1. A vehicle control method comprising:

acquiring, when a work vehicle performs autonomous travel according to a target route, a distance information relating to a distance to a detection target that is detected by a detection unit on the work vehicle;

acquiring image information relating to a capture image of the detection target that is captured by an imaging unit on the work vehicle;

determining a type of the detection target based on the image information; and causing the work vehicle to execute countermeasure processing according to the type of the detection target and the distance information, wherein a likelihood of the type of the detection target is calculated based on the image information, and the work vehicle is made to execute the countermeasure processing based on the calculated likelihood, wherein the work vehicle is made to execute the countermeasure processing when the calculated likelihood exceeds a threshold, wherein the threshold is set to a smaller value as the distance becomes shorter, the threshold is set to a different value depending on a content of the countermeasure processing, the threshold is set to a first threshold when the countermeasure processing is processing that causes the work vehicle to stop while performing autonomous travel, and the threshold is set to a second threshold, which is larger than the first threshold, when the countermeasure processing is processing that causes the work vehicle to decelerate while performing autonomous travel, or processing that provides notification of warning information from the work vehicle.

2. The vehicle control method according to claim 1, wherein the calculated likelihood is based on the image information and the distance information.

3. The vehicle control method according to claim 2, wherein the likelihood of the type of the detection target is calculated such that the calculated likelihood increases as the distance becomes shorter.

4. The vehicle control method according to claim 1, wherein a sensitivity setting indicative of a likelihood of execution of the countermeasure processing is set, and the threshold is additionally set according to the sensitivity setting.

5. The vehicle control method according to claim 4, wherein the sensitivity setting is set according to a user operation.

6. The vehicle control method according to claim 1, wherein the threshold is set based on at least one of a state of a work area in which the work vehicle performs autonomous travel, and a work content performed by the work vehicle.

7. The vehicle control method according to claim 1, wherein the threshold is set according to the type of the detection target.

8. The vehicle control method according to claim 1, wherein the work vehicle includes a short-distance mode in which it is possible to control a motion of the work vehicle within a predetermined range, and a long-distance mode in which it is possible to control a motion of the work vehicle from outside the predetermined range, and the threshold is set to one of a threshold corresponding to the short-distance mode and a threshold corresponding to the long-distance mode.

9. The vehicle control method according to claim 1, wherein the threshold is set to a different value depending on whether the detection target is positioned inside a work area in which the work vehicle is performing autonomous travel, or the detection target is positioned outside the work area.

10. The vehicle control method according to claim 1, wherein the work vehicle includes an individual work mode in which work is performed individually, and a cooperative work mode in which work is performed cooperatively with another work vehicle, and the threshold is set to one of a threshold corresponding to the individual work mode and a threshold corresponding to the cooperative work mode.

11. The vehicle control method according to claim 1, wherein for each type of the detection target, it is possible to set whether or not to make the work vehicle perform the countermeasure processing.

12. A non-transitory computer-readable medium comprising instructions to configure a processor to perform a vehicle control method comprising:

acquiring, when a work vehicle performs autonomous travel according to a target route, distance information relating to a distance to a detection target that is detected by a detection unit on the work vehicle;

acquiring image information relating to a capture image of the detection target that is captured by an imaging unit on the work vehicle;

determining a type of the detection target based on the image information; and causing the work vehicle to execute countermeasure processing, wherein a likelihood of the type of the detection target is calculated based on the image information, and the work vehicle is made to execute the countermeasure processing based on the calculated likelihood, wherein the work vehicle is made to execute the countermeasure processing when the calculated likelihood exceeds a threshold, wherein the threshold is set to a smaller value as the distance becomes shorter, the threshold is set to a different value depending on a content of the countermeasure processing, the threshold is set to a first threshold when the countermeasure processing is processing that causes the work vehicle to stop while performing autonomous travel, and the threshold is set to a second threshold, which is larger than the first threshold, when the countermeasure processing is processing that causes the work vehicle to decelerate while performing autonomous travel, or processing that provides notification of warning information from the work vehicle.

13. A vehicle comprising:

an acquisition processing unit that acquires, when a work vehicle performs autonomous travel according to a target route, distance information relating to a distance to a detection target that is detected by a detection unit on the work vehicle, and image information relating to a capture image of the detection target that is captured by an imaging unit on the work vehicle;

a determination processing unit on the work vehicle that determines a type of the detection target based on the image information; and a countermeasure processing unit that the work vehicle to execute countermeasure processing according to the type of the detection target and the distance information, wherein a likelihood of the type of the detection target is calculated based on the image information, and the work vehicle is made to execute the countermeasure processing based on the calculated likelihood, wherein, the work vehicle is made to execute the countermeasure processing when the calculated likelihood exceeds a threshold, wherein the threshold is set to a smaller value as the distance becomes shorter, the threshold is set to a different value depending on a content of the countermeasure processing, the threshold is set to a first threshold when the countermeasure processing is processing that causes the work vehicle to stop while performing autonomous travel, and the threshold is set to a second threshold, which is larger than the first threshold, when the countermeasure processing is processing that causes the work vehicle to decelerate while performing autonomous travel, or processing that provides notification of warning information from the work vehicle.

* * * * *